US012581467B2

(12) United States Patent
Li et al.

(10) Patent No.: US 12,581,467 B2
(45) Date of Patent: Mar. 17, 2026

(54) TIME RESOURCE ALLOCATION AND RECEIVING METHOD AND RELATED APPARATUS

(71) Applicant: HUAWEI TECHNOLOGIES CO., LTD., Shenzhen (CN)

(72) Inventors: Yunbo Li, Shenzhen (CN); Yuchen Guo, Shenzhen (CN); Guogang Huang, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 18/346,169

(22) Filed: Jun. 30, 2023

(65) Prior Publication Data

US 2023/0354276 A1     Nov. 2, 2023

Related U.S. Application Data

(63) Continuation of application No. PCT/CN2021/138373, filed on Dec. 15, 2021.

(30) Foreign Application Priority Data

Jan. 5, 2021     (CN) .......................... 202110008588.5

(51) Int. Cl.
*H04W 72/0446*     (2023.01)
*H04W 72/23*       (2023.01)

(52) U.S. Cl.
CPC ....... *H04W 72/0446* (2013.01); *H04W 72/23* (2023.01)

(58) Field of Classification Search
CPC .......................... H04W 72/0446; H04W 72/23
See application file for complete search history.

(56) References Cited

U.S. PATENT DOCUMENTS

2020/0396743 A1     12/2020   Park et al.
2021/0352663 A1*    11/2021   Hedayat ............ H04W 72/0446

FOREIGN PATENT DOCUMENTS

| CN | 107027133 A | 8/2017 |
|---|---|---|
| CN | 107211452 A | 9/2017 |
| CN | 107409035 A | 11/2017 |
| CN | 109315013 A | 2/2019 |
| CN | 109600856 A | 4/2019 |
| EP | 3749040 A1 | 12/2020 |
| WO | 2017100337 A1 | 6/2017 |

(Continued)

OTHER PUBLICATIONS

Das et al., "AP assisted SU PPDU Tx for 11be R1," IEEE 802.11-20/1312r4, Oct. 30, 2020, 8 pages.

(Continued)

*Primary Examiner* — Wayne H Cai
(74) *Attorney, Agent, or Firm* — Fish & Richardson P.C.

(57)     ABSTRACT

This application relates to the field of wireless communication. An example method includes a first device generating a media access control (MAC) frame. The MAC frame includes a subfield. The subfield indicates that the MAC frame is a modified multi-user request-to-send frame. The modified multi-user request-to-send frame indicates a time resource allocated to a second device. The example method further includes the first device sending the MAC frame.

20 Claims, 16 Drawing Sheets

(56)                 References Cited

FOREIGN PATENT DOCUMENTS

| WO | 2020040553 A1 | 2/2020 |
| WO | 2020047196 A1 | 3/2020 |

OTHER PUBLICATIONS

Huang et al., "11ax D3.0 MAC Comment Resolution for MU-RTS/CTS—Part I," IEEE 802.11-18/1418r1, Sep. 5, 2018, 12 pages.

Han et al., "Trigger Frame for Frequency-domain A-PPDU Support," IEEE 802.11-20/0831r2, May 20, 2020, 19 pages.

Office Action in Japanese Appln. No. 2023-540911, mailed on Jul. 2, 2024, 6 pages (with English translation).

Das et al., "MAC: Triggered SU Operation," IEEE P802.11 Wireless LANs, Jan. 13, 2021, 6 pages.

International Search Report and Written Opinion in International Appln. No. PCT/CN2021/138373, mailed on Mar. 8, 2022, 16 pages (with English translation).

Office Action in Taiwanese Appln. No. 110149691, mailed on Aug. 2, 2022, 39 pages (with English machine translation).

Extended European Search Report in European Appln No. 21917259.0, dated Apr. 3, 2024, 10 pages.

Das et al., "AP assisted SU PPDU TX for 11be R1," IEEE 802.11-20/1312r8, Oct. 2020, 10 pages.

Ko et al., "TB PPDU Format Signaling in Trigger Frame," IEEE 802.11-20/1192r1, Aug. 2020, 16 pages.

Office Action in Korean Appln. No. 2023-7026538, mailed on Sep. 15, 2025, 12 pages (with English translation).

* cited by examiner

RTS: request-to-send     CTS: clear-to-send
DATA: data               Tr: single-user trigger frame
BA: block acknowledgment

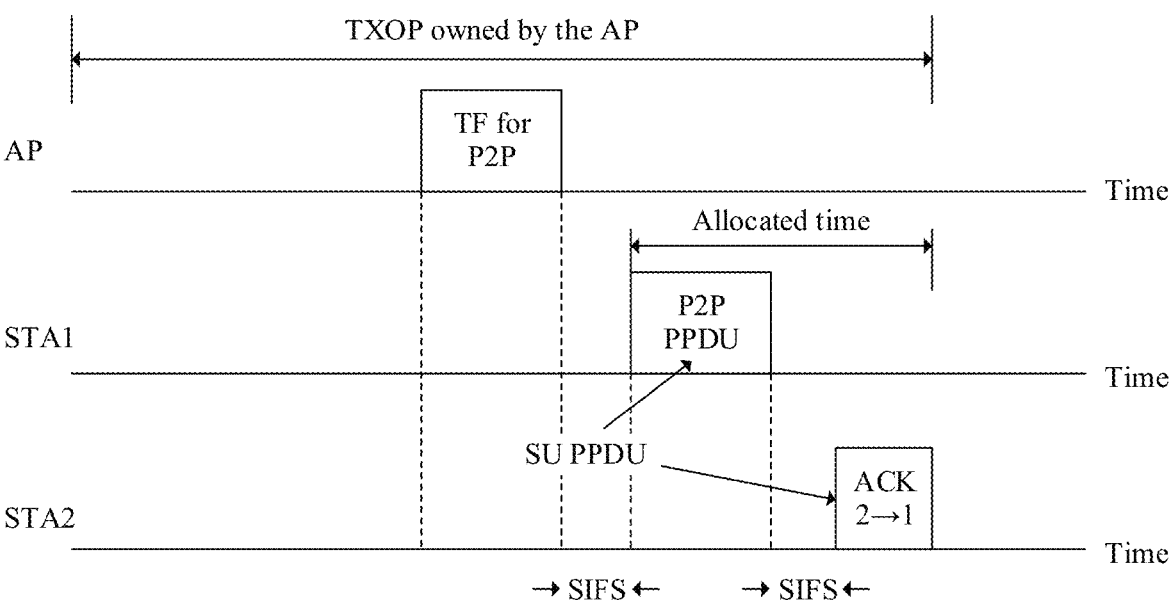

TXOP owned by the AP: transmission opportunity owned the AP
TF for P2P: trigger frame for peer-to-peer
Allocated time: allocated time
P2P PPDU: peer-to-peer physical layer protocol data unit
SU PPDU: single-user physical layer protocol data unit
ACK: acknowledgment     SIFS: short inter-frame space

FIG. 7

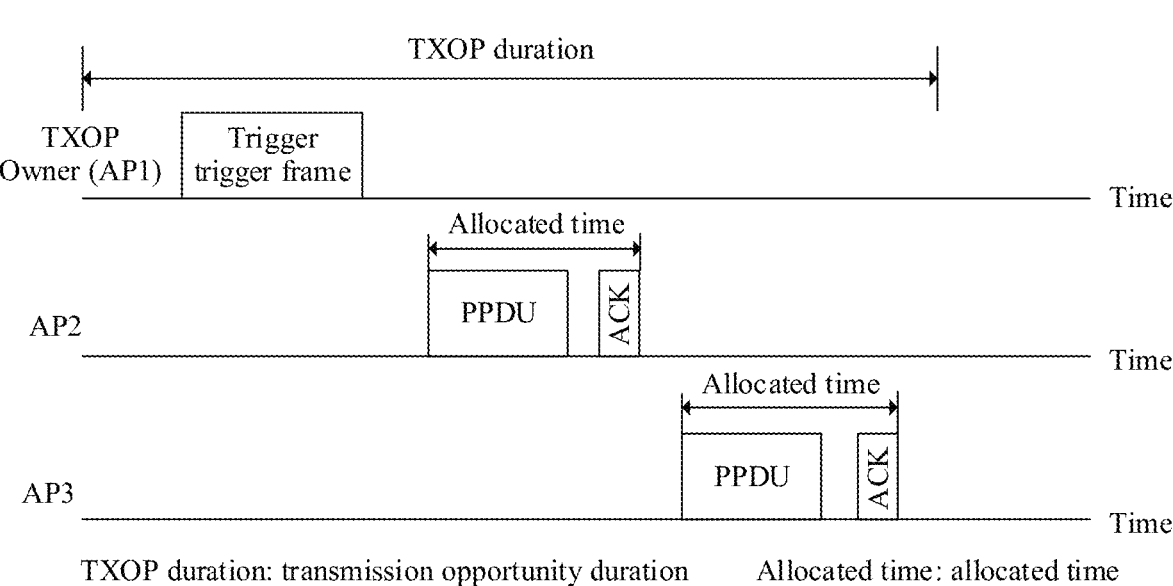

TXOP duration: transmission opportunity duration     Allocated time: allocated time
PPDU: physical layer protocol data unit     ACK: acknowledgment
TXOP Owner: transmission opportunity owner

FIG. 8

TIME RESOURCE ALLOCATION AND RECEIVING METHOD AND RELATED APPARATUS

CROSS-REFERENCE TO RELATED APPLICATIONS

This application is a continuation of International Application No. PCT/CN2021/138373, filed on Dec. 15, 2021, which claims priority to Chinese Patent Application No. 202110008588.5, filed on Jan. 5, 2021. The disclosures of the aforementioned applications are hereby incorporated by reference in their entireties.

TECHNICAL FIELD

This application relates to the field of wireless communication technologies, and in particular, to a time resource allocation and receiving method and a related apparatus.

BACKGROUND

To meet a specific requirement of a user, the Institute of Electrical and Electronics Engineers (institute of electrical and electronic engineers, IEEE) 802.11be standard may support some special application scenarios, for example, a scenario in which a station is scheduled to send an uplink single-user physical layer protocol data unit (physical protocol data unit, PPDU), a scheduled (Scheduled) peer-to-peer (Peer-to-Peer, P2P) scenario, and a coordinated time division multiple access (coordinated time division multiple access, Co-TDMA) scenario.

In a scheduled P2P scenario, a plurality of stations (station, STA) are connected by using a P2P technology to form a small network, so that the plurality of STAs can directly communicate with each other. After obtaining a transmission opportunity (transmission opportunity, TXOP), an access point (access point, AP) may allocate a part of time resources in the TXOP to a STA associated with the access point, so that the STA communicates with another STA on the allocated time resource.

In a Co-TDMA scenario, two AP roles are defined: a sharing (sharing) AP and a shared (shared) AP. After obtaining a TXOP, the sharing AP may allocate a part of time resources in the TXOP to the shared AP, so that the shared AP communicates, on the time resource, with a station associated with the shared AP.

Therefore, a trigger frame is needed in both the scheduled P2P scenario and the Co-TDMA scenario to support time resource allocation. Based on discussion of the current 802.11be standard, it is a potential manner to design the trigger frame by using a multi-user (multiple user, MU) request-to-send (request to send, RTS) frame. However, how to implement time resource allocation in the scheduled P2P scenario and the Co-TDMA scenario based on the MU-RTS frame has not been resolved.

SUMMARY

Embodiments of this application provide a time resource allocation and receiving method and a related apparatus, to indicate time resource allocation by using a single-user trigger frame, to support communication in a scheduled P2P scenario and a Co-TDMA scenario.

The following describes this application from different aspects. It should be understood that mutual reference may be made to the following implementations and beneficial effects of the different aspects.

According to a first aspect, this application provides a time resource allocation method. The method includes: A first device generates and sends a media access control (media access control, MAC) frame. A trigger type subfield in the MAC frame is set to 3 and the MAC frame includes no user information field, and a receiver address field in the MAC frame is set to a MAC address of a second device. That the trigger type subfield in the MAC frame is set to 3 and the MAC frame includes no user information field indicates that the MAC frame is a single-user trigger frame. In other words, the MAC frame is a single-user trigger frame whose trigger type subfield is set to 3 and that includes no user information field, and the single-user trigger frame is used to allocate a time resource to the second device. The time resource herein refers to time duration.

Optionally, that the trigger type subfield is set to 3 indicates an MU-RTS frame. However, because the MU-RTS frame is sent to one or more users (or stations), the MU-RTS frame necessarily includes one or more user information fields. Therefore, in this solution, although the trigger type subfield of the MAC frame is set to 3, the MAC frame includes no user information field, indicating that the MAC frame is a single-user trigger frame rather than an MU-RTS frame.

It can be learned that in this solution, the trigger type subfield of the MAC frame is set to 3 and the MAC frame includes no user information field, implicitly indicating that the currently sent MAC frame is a single-user trigger frame. The single-user trigger frame may indicate time resource allocation, to support communication in a scheduled P2P scenario and a Co-TDMA scenario.

According to a second aspect, this application provides a time resource receiving method. The method includes: A second device receives a MAC frame from a first device, where a receiver address field in the MAC frame is set to a MAC address of the second device; parsing, by the second device, the MAC frame, to obtain that a trigger type subfield in the MAC frame is set to 3 and the MAC frame includes no user information field; and the second device determines, according to that the trigger type subfield in the MAC frame is set to 3 and the MAC frame includes no user information field, that the MAC frame is a single-user trigger frame, where the single-user trigger frame is used to allocate a time resource to the second device. The time resource herein refers to time duration. The time resource herein refers to time duration.

Optionally, that the trigger type subfield is set to 3 indicates an MU-RTS frame. However, because the MU-RTS frame is sent to one or more users (or stations), the MU-RTS frame necessarily includes one or more user information fields. Therefore, in this solution, although the trigger type subfield of the MAC frame is set to 3, the MAC frame includes no user information field, indicating that the MAC frame is a single-user trigger frame rather than an MU-RTS frame.

According to a third aspect, this application provides a time resource allocation apparatus. The time resource allocation apparatus may be a first device or a chip in the first device, for example, a Wi-Fi chip. The time resource allocation apparatus includes: a processing unit, configured to generate a MAC frame, where a trigger type subfield in the MAC frame is set to 3 and the MAC frame includes no user information field, and a receiver address field in the MAC frame is set to a MAC address of a second device; and a transceiver unit, configured to send the MAC frame. That the trigger type subfield in the MAC frame is set to 3 and the MAC frame includes no user information field indicates that the MAC frame is a single-user trigger frame. In other words, the MAC frame is a single-user trigger frame whose trigger type subfield is set to 3 and that includes no user information field, where the single-user trigger frame is used to allocate a time resource to the second device. The time resource herein refers to time duration.

Optionally, that the trigger type subfield is set to 3 indicates an MU-RTS frame. However, because the MU-RTS frame is sent to one or more users (or stations), the MU-RTS frame necessarily includes one or more user information fields. Therefore, in this solution, although the trigger type subfield of the MAC frame is set to 3, the MAC frame includes no user information field, indicating that the MAC frame is a single-user trigger frame rather than an MU-RTS frame.

According to a fourth aspect, this application provides a time resource receiving apparatus. The time resource receiving apparatus may be a second device or a chip in the second device, for example, a Wi-Fi chip. The time resource receiving apparatus includes: a transceiver unit, configured to receive a MAC frame, where a receiver address field in the MAC frame is set to a MAC address of the second device; a parsing unit, configured to parse the MAC frame, to obtain that a trigger type subfield in the MAC frame is set to 3 and the MAC frame includes no user information field; and a determining unit, configured to determine, according to that the trigger type subfield in the MAC frame is set to 3 and the MAC frame includes no user information field, that the MAC frame is a single-user trigger frame, where the single-user trigger frame is used to allocate a time resource to the second device. The time resource herein refers to time duration.

Optionally, that the trigger type subfield is set to 3 indicates an MU-RTS frame. However, because the MU-RTS frame is sent to one or more users (or stations), the MU-RTS frame necessarily includes one or more user information fields. Therefore, in this solution, although the trigger type subfield of the MAC frame is set to 3, the MAC frame includes no user information field, indicating that the MAC frame is a single-user trigger frame rather than an MU-RTS frame.

In a possible implementation of any one of the foregoing aspects, a duration (duration) field in the MAC frame may indicate time duration allocated to the second device. Because an original meaning of the duration field indicates information about remaining duration of a current transmission opportunity, reusing the duration field to indicate the time duration allocated to the second device is equivalent to allocating all the remaining duration of the entire transmission opportunity to the second device.

It can be learned that in this solution, an original duration field is reused, and a meaning of the original duration field is extended, so that the duration field has two meanings (one indicates information about remaining duration of a current transmission opportunity, and the other indicates time duration allocated to the second device), and the second device can communicate with another station on the allocated time resource without adding a new field, to support communication in a scheduled P2P scenario and a Co-TDMA scenario. Implementation is simple.

In a possible implementation of any one of the foregoing aspects, the MAC frame includes a first subfield, and the first subfield indicates time duration allocated to the second device. Alternatively, the first subfield indicates time duration of a response frame. It should be understood that the first subfield is different from the duration field. The time duration allocated to the second device and indicated by the first subfield is a period of time within duration of the remaining transmission opportunity.

It can be learned that in this solution, a new field is designed in a modified MU-RTS frame (or a single-user trigger frame) to indicate time duration allocated to the second device, and a meaning of the new field is clear and explicit.

In a possible implementation of any one of the foregoing aspects, the first subfield is a reserved subfield in a common information field of the MAC frame. A length of the first subfield may be shorter than or equal to a length of the duration field.

It can be learned that in this solution, a reserved subfield in the common information field of the MAC frame is used to design the first subfield, without adding a new field. An original frame length is maintained, so that the reserved subfield in the common information field can be fully used, and a meaning of the first subfield is clear and explicit.

In a possible implementation of any one of the foregoing aspects, the first subfield is an up link length (up link length, UL length) subfield reserved in the common information field of the MAC frame, which is referred to as a uplink length (UL length) subfield for short below.

It can be learned that a UL length subfield in another type of trigger frame (a trigger frame whose value of the trigger type subfield is not 3) indicates a frame length (the frame length herein is time duration) of a triggered trigger-based PPDU (Trigger Based PPDU, TB PPDU), but the UL length subfield is not used or does not exist in the MU-RTS frame. Therefore, in this solution, the UL length subfield indicates the duration allocated to the second device, and the UL length subfield may be reused to indicate a duration granularity. Such function is similar to that of the UL length subfield.

In a possible implementation of any one of the foregoing aspects, the length of the first subfield is 12 bits or 16 bits. It can be learned that when the length of the first subfield is 12 bits, the length is the same as a length of the UL length subfield, and the UL length subfield may be reused to indicate a duration granularity. When the length of the first subfield is 16 bits, the length is the same as a length of the duration field, and the duration field may be reused to indicate a duration granularity.

According to a fifth aspect, this application provides a time resource allocation method. The method includes: A first device generates and sends a MAC frame. The MAC frame includes a second subfield, the second subfield indicates that the MAC frame is a single-user trigger frame, and the single-user trigger frame is used to allocate a time resource to a second device. The time resource herein refers to time duration. A trigger type subfield in the MAC frame is set to 3.

Optionally, that the trigger type subfield is set to 3 indicates an MU-RTS frame. However, the second subfield in the MAC frame indicates that the MAC frame is a single-user trigger frame rather than an MU-RTS frame, to distinguish between the MU-RTS frame and the single-user trigger frame.

It can be learned that in this solution, a field is designed in the MAC frame to explicitly indicate that the currently sent MAC frame is a single-user trigger frame, and the single-user trigger frame may indicate time resource allocation, to support communication in a scheduled P2P scenario and a Co-TDMA scenario.

According to a sixth aspect, this application provides a time resource receiving method. The method includes: A second device receives a MAC frame from a first device, and parses the received MAC frame. The MAC frame includes a second subfield, the second subfield indicates that the MAC frame is a single-user trigger frame, and the single-user trigger frame is used to allocate a time resource to the second device. The time resource herein refers to time duration. A trigger type subfield in the MAC frame is set to 3.

Optionally, that the trigger type subfield is set to 3 indicates an MU-RTS frame. However, the second subfield in the MAC frame indicates that the MAC frame is a single-user trigger frame rather than an MU-RTS frame, to distinguish between the MU-RTS frame and the single-user trigger frame.

According to a seventh aspect, this application provides a time resource allocation apparatus. The time resource allocation apparatus may be a first device or a chip in the first device, for example, a Wi-Fi chip. The time resource allocation apparatus includes: a processing unit, configured to generate a MAC frame, where the MAC frame includes a second subfield, the second subfield indicates that the MAC frame is a single-user trigger frame, and the single-user trigger frame is used to allocate a time resource to a second device; and a transceiver unit, configured to send the MAC frame. The time resource herein refers to time duration. A trigger type subfield in the MAC frame is set to 3.

Optionally, that the trigger type subfield is set to 3 indicates an MU-RTS frame. However, the second subfield in the MAC frame indicates that the MAC frame is a single-user trigger frame rather than an MU-RTS frame, to distinguish between the MU-RTS frame and the single-user trigger frame.

According to an eighth aspect, this application provides a time resource receiving apparatus. The time resource receiving apparatus may be a second device or a chip in the second device, for example, a Wi-Fi chip. The time resource receiving apparatus includes: a transceiver unit, configured to receive a MAC frame, where the MAC frame includes a second subfield, the second subfield indicates that the MAC frame is a single-user trigger frame, and the single-user trigger frame is used to allocate a time resource to the second device; and a parsing unit, configured to parse the MAC frame. The time resource herein refers to time duration. A trigger type subfield in the MAC frame is set to 3.

Optionally, that the trigger type subfield is set to 3 indicates an MU-RTS frame. However, the second subfield in the MAC frame indicates that the MAC frame is a single-user trigger frame rather than an MU-RTS frame, to distinguish between the MU-RTS frame and the single-user trigger frame.

In a possible implementation of any one of the foregoing aspects, the second subfield is a resource unit (resource unit, RU) allocation subfield whose value is a first preset value in a user information field of the MAC frame. The first preset value is an RU allocation value that is not used in the 802.11be standard and that is of values 0 to 60 and 68 to 255.

It can be learned that in this solution, the RU allocation (allocation) subfield is reused, without changing meanings of some values of the RU allocation subfield, and a special value is used to indicate a single-user trigger frame. A small change is made on an MU-RTS frame, facilitating compatibility with the 802.11ax standard.

In a possible implementation of any one of the foregoing aspects, the second subfield is an association identifier (Association Identifier, AID) 12 subfield whose value is a second preset value in the user information field of the MAC frame, and the second preset value is one of 2008 to 2044 and 2047 to 4094.

Optionally, because the AID12 subfield is set to the second preset value and cannot be used to identify a station, the receiver address field in the MAC frame is set to the MAC address of the second device.

Optionally, because the AID12 subfield is set to the second preset value and cannot be used to identify a station, a reserved subfield in the user information field of the MAC frame is used to indicate an association identifier of the second device.

It can be learned that in this solution, an AID12 subfield is reused, without changing meanings of some values of the AID12 subfield, and a special value is used to indicate a single-user trigger frame. A small change is made on an MU-RTS frame, facilitating compatibility with the 802.11ax standard. In addition, the AID12 subfield is the first subfield in the user information field. This can help the second device determine whether a received frame is a single-user trigger frame more quickly, so that the second device responds correspondingly more quickly.

In a possible implementation of any one of the foregoing aspects, the second subfield is a reserved subfield in the common information field of the MAC frame, and a value of the second subfield is different from a value of the second subfield in a reserved state.

It can be learned that in this solution, a reserved subfield in the common information field is used to indicate a single-user trigger frame. The meaning is clear and explicit, unlikely to cause confusion. In addition, the common information field is located after a transmitter address field. This can help the second device determine whether a received frame is a single-user trigger frame more quickly, so that the second device responds more quickly.

In a possible implementation of any one of the foregoing aspects, the second subfield is a reserved subfield in the user information field of the MAC frame, and a value of the second subfield is different from a value of the second subfield in a reserved state.

It can be learned that in this solution, a reserved subfield in the user information field is used to indicate a single-user trigger frame. The meaning is clear and explicit, unlikely to cause confusion.

In a possible implementation of any one of the foregoing aspects, a duration (duration) field in the MAC frame may indicate time duration allocated to the second device. Because an original meaning of the duration field indicates information about remaining duration of a current transmission opportunity, reusing the duration field to indicate the time duration allocated to the second device is equivalent to allocating all the remaining duration of the entire transmission opportunity to the second device.

In a possible implementation of any one of the foregoing aspects, the MAC frame further includes a first subfield, and the first subfield indicates time duration allocated to the second device. Alternatively, the first subfield indicates time duration of a response frame. It should be understood that the first subfield is different from the duration field. The time duration allocated to the second device and indicated by the first subfield is a period of time within duration of the remaining transmission opportunity.

In a possible implementation of any one of the foregoing aspects, the first subfield is a reserved subfield in the common information field of the MAC frame. A length of the first subfield may be shorter than or equal to a length of the duration field.

In a possible implementation of any one of the foregoing aspects, the first subfield is an uplink length (UL length) subfield reserved in the common information field of the MAC frame.

In a possible implementation of any one of the foregoing aspects, the length of the first subfield is 12 bits or 16 bits.

According to a ninth aspect, this application provides a communication apparatus, which is specifically the first device in the first aspect or the fifth aspect, and includes a processor and a transceiver.

In a design, the processor is configured to generate a MAC frame, where a trigger type subfield in the MAC frame is set to 3 and the MAC frame includes no user information field, and a receiver address field in the MAC frame is set to a MAC address of a second device. The transceiver is configured to send the MAC frame. That the trigger type subfield in the MAC frame is set to 3 and the MAC frame includes no user information field indicates that the MAC frame is a single-user trigger frame, where the single-user trigger frame is used to allocate a time resource to the second device. The time resource herein refers to time duration.

In another design, the processor is configured to generate a MAC frame, where the MAC frame includes a second subfield, the second subfield indicates that the MAC frame is a single-user trigger frame, and the single-user trigger frame is used to allocate a time resource to a second device. The transceiver is configured to send the MAC frame. The time resource herein refers to time duration. A trigger type subfield in the MAC frame is set to 3.

According to a tenth aspect, this application provides a communication apparatus, which is specifically the second device in the second aspect or the sixth aspect, and includes a processor and a transceiver.

In a design, the transceiver is configured to receive a MAC frame, where a receiver address field in the MAC frame is set to a MAC address of the second device. The processor is configured to parse the MAC frame, to obtain that a trigger type subfield in the MAC frame is set to 3 and the MAC frame includes no user information field. The processor is further configured to determine, according to that the trigger type subfield in the MAC frame is set to 3 and the MAC frame includes no user information field, that the MAC frame is a single-user trigger frame, where the single-user trigger frame is used to allocate a time resource to the second device. The time resource herein refers to time duration.

In another design, the transceiver is configured to receive a MAC frame, where the MAC frame includes a second subfield, the second subfield indicates that the MAC frame is a single-user trigger frame, and the single-user trigger frame is used to allocate a time resource to the second device. The processor is further configured to parse the MAC frame. The time resource herein refers to time duration. A trigger type subfield in the MAC frame is set to 3.

According to an eleventh aspect, this application provides an apparatus. The apparatus is implemented in a product form of a chip, and includes an input/output interface and a processing circuit. The apparatus is a chip in the first device according to the first aspect or the fifth aspect.

In a design, the processing circuit is configured to generate a MAC frame, where a trigger type subfield in the MAC frame is set to 3 and the MAC frame includes no user information field, and a receiver address field in the MAC frame is set to a MAC address of a second device. The input/output interface is configured to output the MAC frame, and send the MAC frame through an antenna after processing by using a radio frequency circuit. That the trigger type subfield in the MAC frame is set to 3 and the MAC frame includes no user information field indicates that the MAC frame is a single-user trigger frame, where the single-user trigger frame is used to allocate a time resource to the second device. The time resource herein refers to time duration.

In another design, the processing circuit is configured to generate a MAC frame, where the MAC frame includes a second subfield, the second subfield indicates that the MAC frame is a single-user trigger frame, and the single-user trigger frame is used to allocate a time resource to a second device. The input/output interface is configured to output the MAC frame, and send the MAC frame through an antenna after processing by using a radio frequency circuit. The time resource herein refers to time duration. A trigger type subfield in the MAC frame is set to 3.

According to a twelfth aspect, this application provides an apparatus. The apparatus is implemented in a product form of a chip, and includes an input/output interface and a processing circuit. The apparatus is a chip in the second device according to the second aspect or the sixth aspect.

In a design, the input/output interface is configured to receive a MAC frame through an antenna and a radio frequency circuit, where a receiver address field in the MAC frame is set to a MAC address of the second device. The processing circuit is configured to parse the MAC frame, to obtain that a trigger type subfield in the MAC frame is set to 3 and the MAC frame includes no user information field. The processing circuit is further configured to determine, according to that the trigger type subfield in the MAC frame is set to 3 and the MAC frame includes no user information field, that the MAC frame is a single-user trigger frame, where the single-user trigger frame is used to allocate a time resource to the second device. The time resource herein refers to time duration.

In another design, the input/output interface is configured to input a MAC frame received through an antenna and a radio frequency circuit. The processing circuit is configured to parse the MAC frame, where the MAC frame includes a second subfield, the second subfield indicates that the MAC frame is a single-user trigger frame, and the single-user trigger frame is used to allocate a time resource to the second device. A trigger type subfield in the MAC frame is set to 3.

According to a thirteenth aspect, this application provides a computer-readable storage medium. The computer-readable storage medium stores program instructions. When the program instructions are run on a computer, the computer is enabled to perform the time resource allocation method according to the first aspect or the fifth aspect; or when the program instructions are run on a computer, the computer is enabled to perform the time resource receiving method according to the second aspect or the sixth aspect.

According to a fourteenth aspect, this application provides a computer program product including program instructions. When the computer program product runs on a computer, the computer is enabled to perform the time resource allocation method according to the first aspect or the fifth aspect; or when the computer program product runs on a computer, the computer is enabled to perform the time resource receiving method according to the second aspect or the sixth aspect.

During implementation of embodiments of this application, a single-user trigger frame may indicate time resource allocation, to support communication in a scheduled P2P scenario and a Co-TDMA scenario.

BRIEF DESCRIPTION OF DRAWINGS

To describe the technical solutions in embodiments of this application more clearly, the following briefly describes the accompanying drawings used for describing the embodiments.

FIG. 7 is a schematic diagram of applying a single-user trigger frame to a scheduled P2P scenario;

FIG. 8 is a schematic diagram of applying a single-user trigger frame to a Co-TDMA scenario;

DESCRIPTION OF EMBODIMENTS

Figure 1A:
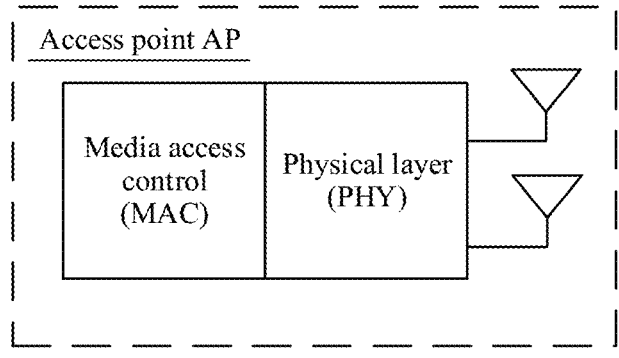
FIG. 1*a* is a schematic diagram depicting a structure of an access point according to an embodiment of this application.

The following clearly and completely describes the technical solutions in embodiments of this application with reference to the accompanying drawings in embodiments of this application.

In descriptions of this application, unless otherwise specified, "I" means "or". For example, AB may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described by using "example" or "for example" in this application shall not be construed as being more preferred or having more advantages than another embodiment or design scheme. Exactly, use of the word such as "example" or "for example" is intended to present a related concept in a specific manner.

The technical solutions provided in this application may be applied to various communication systems, for example, a system complying with a IEEE 802.11 standard. For example, the IEEE 802.11 standard includes but is not limited to the 802.11be standard or a next-generation 802.11 standard. Application scenarios of the technical solutions of this application include communication between an AP and a STA, communication between APs, communication between STAs, and the like.

An access point (AP) in this application is an apparatus having a wireless communication function, supports communication by using a wireless local area network (wireless local area networks, WLAN) protocol, and has a function of communicating with another device (for example, a station or another access point) in a WLAN network, and certainly, may further have a function of communicating with another device. In a WLAN system, an access point may be referred to as an access point station (AP STA). The apparatus having a wireless communication function may be an entire device, or may be a chip or a processing system installed in the entire device. The device in which the chip or the processing system is installed may implement the method and the function in embodiments of this application under control of the chip or the processing system. An AP in embodiments of this application is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and function in embodiments of this application.

A station (STA) in this application is an apparatus having a wireless communication function, supports communication by using a WLAN protocol, and has a capability of communicating with another station or access point in a WLAN network. In a WLAN system, a station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in the entire device. The device in which the chip or the processing system is installed may implement the method and the function in embodiments of this application under control of the chip or the processing system. For example, the STA may be user equipment that can connect to the internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in smart city, a smart device (for example, a smart camera, a projector, a display, a television, a stereo, a refrigerator, or a washing machine) in smart home, a node in the internet of things, an entertainment terminal (for example, augmented reality (augmented reality, AR), virtual reality (virtual reality, VR), or other wearable devices), a smart device (for example, a printer, a projector, a loudspeaker, or a stereo) in smart office, an internet of vehicle device in the internet of vehicle, an infrastructure (for example, a vending machine, a self-service navigation station of a supermarket, a self-service cash register device, or a self-service ordering machine) in daily life scenarios, a device in a large sports or music venue, and the like. Specific forms of the STA and the AP are not limited in embodiments of this application, and are merely examples for description herein.

Figure 1B:
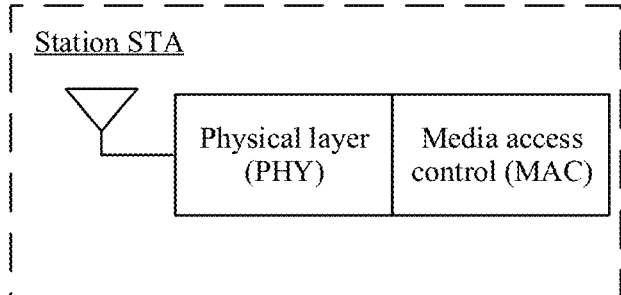
FIG. 1B is a schematic diagram depicting a structure of a station according to an embodiment of this application.

It should be understood that the 802.11 standard focuses on a physical (physical layer, PHY) layer and a media access control (media access control, MAC) layer part. Refer to FIG. 1a for an example. FIG. 1a is a schematic diagram depicting a structure of an access point according to an embodiment of this application. The AP may be multi-antenna/multi-radio frequency, or may be single-antenna/single-radio frequency. The antenna/radio frequency is used to send/receive a data packet. In an implementation, an antenna or a radio frequency part of the AP may be separated, in other words, separated from a main body of the AP. In FIG. 1a, the AP may include a physical layer processing circuit and a media access control layer processing circuit. The physical layer processing circuit may be configured to process a physical layer signal, and the MAC layer processing circuit may be configured to process a MAC layer signal. Refer to FIG. 1B for another example. FIG. 1B is a schematic diagram depicting a structure of a station according to an embodiment of this application. FIG. 1B is a schematic diagram depicting a structure of a single-antenna/single-radio frequency STA. In an actual scenario, the STA may also be multi-antenna/multi-radio frequency, and may be a device with more than two antennas. The antenna/radio frequency is used to send/receive a data packet. In an implementation, an antenna or a radio frequency part of the STA may be separated, in other words, separated from a main body of the STA. In FIG. 1B, the STA may include a PHY processing circuit and a MAC processing circuit. The physical layer processing circuit may be configured to process a physical layer signal, and the MAC layer processing circuit may be configured to process a MAC layer signal.

To better understand the technical solutions provided in this application, the following briefly describes an application scenario of a time resource allocation and receiving method provided in embodiments of this application.

The time resource allocation and receiving method provided in embodiments of this application may be applied to a scheduled P2P scenario and a Co-TDMA scenario, and optionally may be further applied to a multi-link scenario.

An extremely high throughput (extremely high throughput, EHT) device complying with a 802.11 next-generation wireless fidelity (Wireless Fidelity, Wi-Fi) protocol supports improvement of a peak throughput and reduction of a service transmission delay through multiple streams, multiple frequency bands (such as 2.4 GHz, 5 GHz, and 6 GHz frequency bands), cooperation between multiple channels on a same frequency band, and the like. The multiple frequency bands or the multiple channels may be collectively referred to as a multi-link (multi-link, ML).

A multi-link device (Multi-link Device, MLD) includes one or more affiliated stations (affiliated STA). The affiliated station may be a logical station or a physical station. In embodiments of this application, "the multi-link device includes an affiliated station" may be briefly described as "the multi-link device includes a station".

The affiliated station may be an access point (access point, AP) or a non-access point station (non-access point station, non-AP STA). For ease of description, in embodiments of this application, a multi-link device whose affiliated station is an AP may be referred to as an AP MLD, and a multi-link device whose affiliated station is a STA may be referred to as a non-AP MLD.

The multi-link device may implement wireless communication in compliance with the 802.11 system protocol. For example, the 802.11 system protocol may be an 802.11ax protocol, an 802.11be protocol, or a next-generation 802.11 protocol. This is not limited in this embodiment of this application.

The multi-link device may communicate with another device. In this embodiment of this application, the another device may be a multi-link device, or may not be a multi-link device.

Figure 2A:
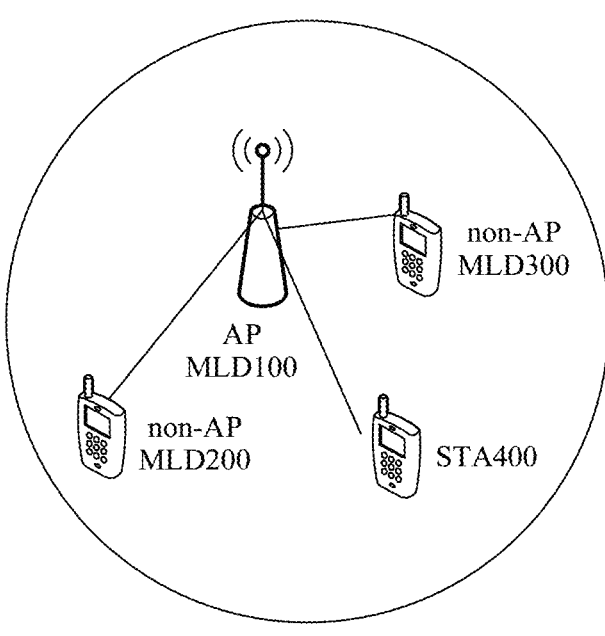
FIG. 2*a* is a schematic diagram of a scenario of communication between an AP MLD and a non-AP MLD.
Figure 2B:
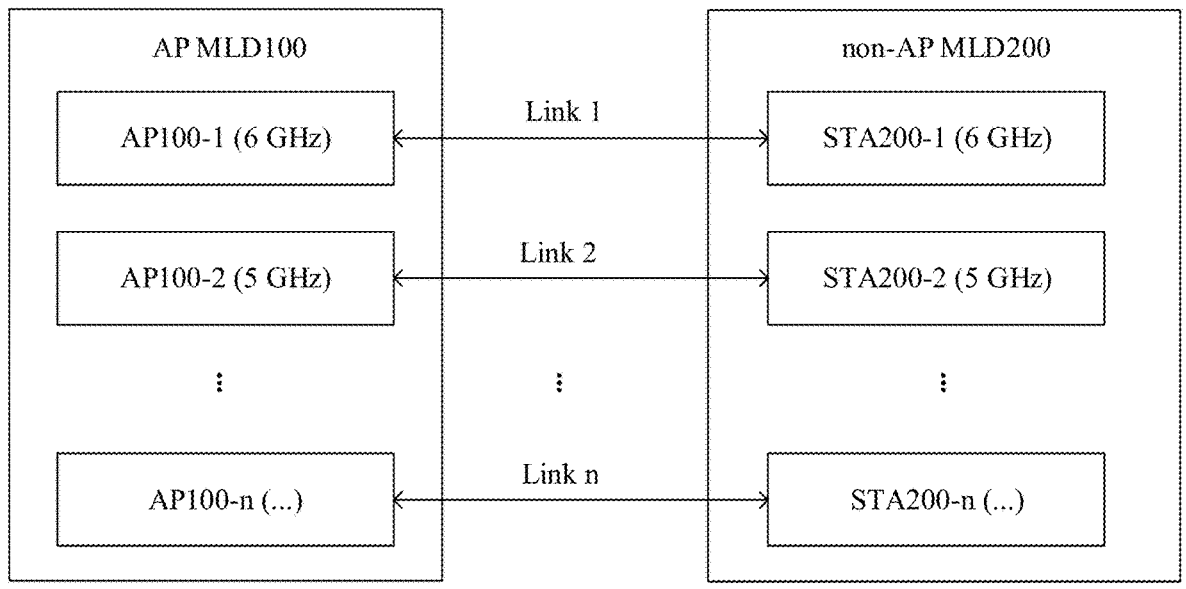
FIG. 2*b* is a schematic diagram of another scenario of communication between an AP MLD and a non-AP MLD.

Refer to FIG. 2a. FIG. 2a is a schematic diagram of a scenario of communication between an AP MLD and a non-AP MLD. As shown in FIG. 2a, one AP MLD may be associated with a plurality of non-AP MLDs and a single-link STA (that is, a non-MLD STA). For example, an AP MLD100 may be associated with a non-AP MLD200, a non-AP MLD300, and a STA400. It should be understood that a plurality of APs of the AP MLD separately work over a plurality of links, a plurality of STAs of the non-AP MLD separately work over a plurality of links, and a STA of the non-AP MLD is associated with an AP of the AP MLD over a working link of the STA. A single-link STA (that is, a non-MLD STA) is associated with an AP of an AP MLD over a working link of the single-link STA. Refer to FIG. 2b. FIG. 2b is a schematic diagram of another scenario of communication between an AP MLD and a non-AP MLD. As shown in FIG. 2b, a wireless communication system includes at least one AP MLD (for example, an AP MLD100 in FIG. 2b) and at least one non-AP MLD (for example, a non-AP MLD200 in FIG. 2b). The AP MLD is a multi-link device that provides a service for the non-AP MLD, and the non-AP MLD may communicate with the AP MLD over a plurality of links. One AP in the AP MLD may communicate with one STA in the non-AP MLD over one link. It may be understood that quantities of AP MLDs and non-AP MLDs in FIG. 2b are merely an example.

Figure 3A:
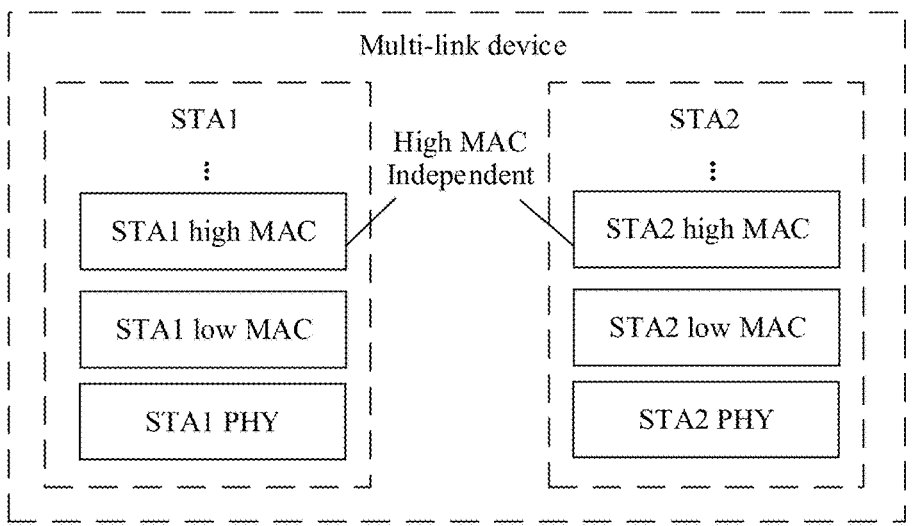
FIG. 3*a* is a schematic diagram depicting a structure of a multi-link device according to an embodiment of this application.
Figure 3B:
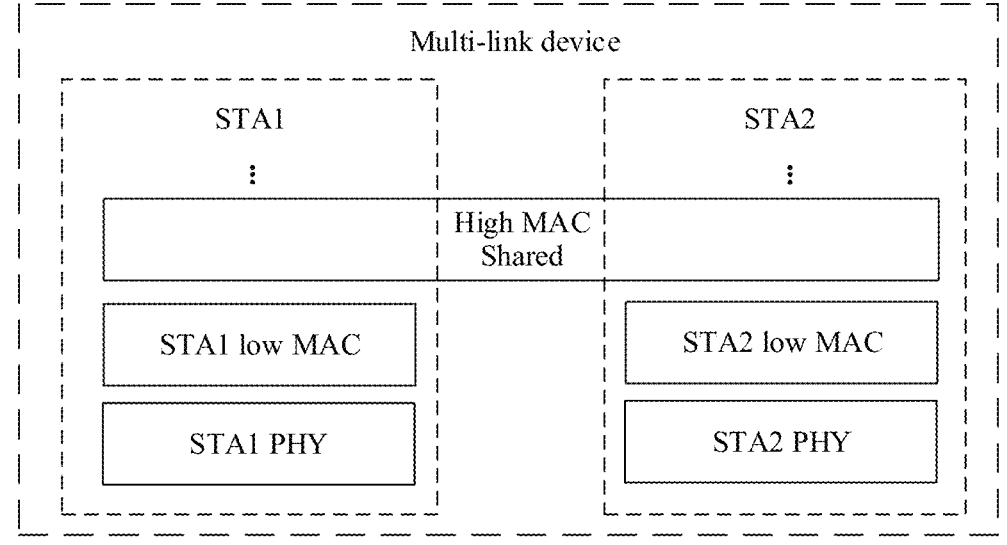
FIG. 3*b* is a schematic diagram depicting another structure of a multi-link device according to an embodiment of this application.

The 802.11 standard focuses on a 802.11 physical layer (Physical layer, PHY) and media access control (Media Access Control, MAC) layer part in the AP MLD and the non-AP MLD. Refer to FIG. 3a. FIG. 3a is a schematic diagram depicting a structure of a multi-link device according to an embodiment of this application. As shown in FIG. 3a, a plurality of STAs included in the multi-link device are independent of each other at a low MAC (low MAC) layer and a PHY layer, and are also independent of each other at a high MAC (high MAC) layer. Refer to FIG. 3b. FIG. 3b is a schematic diagram depicting another structure of a multi-link device according to an embodiment of this application. As shown in FIG. 3b, a plurality of STAs included in the multi-link device are independent of each other at a low MAC (Low MAC) layer and a PHY layer, and share a high MAC (High MAC) layer.

Certainly, the non-AP MLD may use a structure with high MAC layers independent of each other, and the AP MLD uses a structure with a shared high MAC layer. Alternatively, the non-AP MLD uses a structure with a shared high MAC layer, and the AP MLD uses a structure with high MAC layers independent of each other. For example, the high MAC layer or the low MAC layer may be implemented by a processor in a chip system of the multi-link device, or may be implemented by different processing modules in a chip system.

A frequency band on which the multi-link device operates may include but is not limited to sub 1 GHz, 2.4 GHz, 5 GHz, 6 GHz, and a high frequency 60 GHz.

The multi-link device may support simultaneous data sending and receiving (simultaneously transmit and receive, STR), or the multi-link device may not support simultaneous data sending and receiving (non-STR). That simultaneous data sending and receiving is supported means that when a STA of a multi-link device sends a frame over a link, another STA of the multi-link device may receive a frame over another link. That simultaneous data sending and receiving is not supported means that when a STA of a multi-link device sends a frame over a link, another STA of the multi-link device cannot receive a frame over another link or clear channel assessment is blocked.

When a non-AP MLD does not support simultaneous data sending and receiving (that is, a capability of the non-AP MLD is non-STR), in a data transmission process between the non-AP MLD and an AP MLD, radio frames sent by the AP MLD over a plurality of links need to be aligned at ends, and response frames sent by the non-AP MLD over a plurality of links also need to be aligned at both start time and end time.

In a communication scenario of a non-STR multi-link device, a trigger frame is needed to control a length of a response frame, to ensure that response frames transmitted over different links can be aligned. It should be understood that a "multi-link scenario" in this specification refers to a "communication scenario of a multi-link device that does not support STR".

A trigger frame in a current standard is designed for multiple users to simultaneously send an uplink trigger-based PPDU (Trigger Based PPDU, TB PPDU). Therefore, the current trigger frame needs to indicate information such as a modulation and coding scheme (Modulation and Coding Scheme, MCS), a resource unit (Resource unit, RU), and transmit power. However, in a multi-link scenario, if only lengths of response frames need to be aligned, only frame lengths of the response frames need to be indicated. Therefore, the current trigger frame causes unnecessary system overheads. In addition, a current trigger frame can trigger only a TB PPDU. In a multi-link scenario, a trigger frame used to control a response frame length is used to trigger only one station to respond, so that the station does not need to use a TB PPDU, but may use a single-user PPDU. The single-user PDDU has more advantages than the TB PPDU: (1) The single-user PPDU can better protect the channel. A third-party station can parse content of the single-user PDDU, but cannot parse content of the TB PPDU. A duration field in the TB PPDU cannot be obtained if the content of the TB PPDU cannot be parsed, and a network allocation vector (Network Allocation Vector, NAV) cannot be set. (2) Overhead of the single-user PPDU is lower than that of the TB PPDU in a physical layer frame header.

To solve this technical problem, a concept of single-user trigger frame (single user trigger frame, SU TF) is proposed. The single-user trigger frame may trigger a single STA to respond in a single-user PPDU manner. The single-user trigger frame may be applied to a multi-link scenario, and may be further applied to a scheduled P2P scenario and a Co-TDMA scenario.

Figure 4:
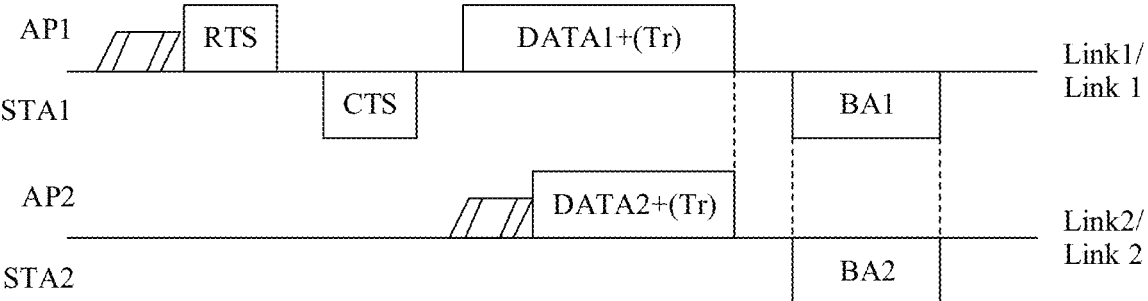
FIG. 4 is a schematic diagram of applying a single-user trigger frame to a multi-link scenario.

For example, refer to FIG. 4. FIG. 4 is a schematic diagram of applying a single-user trigger frame to a multi-link scenario. The single-user trigger frame may be carried in downlink data or aggregated with a data frame, and the single-user trigger frame includes an assigned duration (assigned time duration) field. The assigned duration field indicates a length of a single-user PPDU (or a response frame) fed back by a station. As shown in FIG. 4, an AP1 and a STA1 are associated and work over a link 1 (link1). An AP2 and a STA2 are associated and work over a link 2 (link2). The AP1 and the AP2 belong to a same AP MLD, the STA1 and the STA2 belong to a same non-AP MLD, and a capability of the non-AP MLD is non-STR. The AP1 sends data (data) 1 and a single-user trigger frame to the STA1 over the link 1, and the AP2 sends data 2 and a single-user trigger frame to a receive end over the link 2. The STA1 sends a block acknowledgment (block ack, BA) frame 1 over the link 1 according to an indication of the single-user trigger frame, and the STA2 sends a BA2 over the link 2. The BA1 and the BA2 are aligned in time domain. In FIG. 4, "Tr" represents a single-user trigger frame.

It should be understood that the multi-link scenario may be understood as one of scenarios in which a station is scheduled to send an uplink SU PPDU. This is because a station is scheduled, by using a single-user trigger frame, to send an uplink SU PPDU in a multi-link scenario. In another scenario in which a station is scheduled to send an uplink SU PPDU, the station is scheduled to send a plurality of uplink SU PPDUs. The scenario in which a station is scheduled to send a plurality of uplink SU PPDUs is as follows: After obtaining a TXOP through contention, an AP may allocate a part of time resources in the TXOP to a STA associated with the AP, so that the STA may send a plurality of uplink SU PPDUs to the AP on the allocated time resources, to implement uplink communication.

Figure 5:
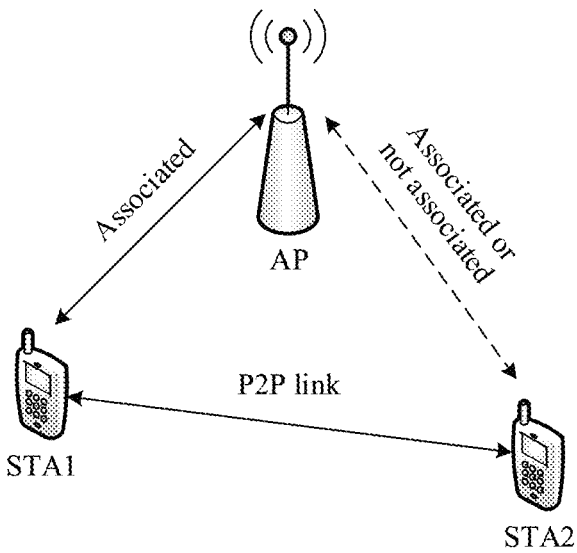
FIG. 5 is a schematic diagram of a scheduled P2P scenario.

A design principle of scheduled P2P is that after obtaining a TXOP through contention, an AP may allocate a part of time resources in the TXOP to a STA associated with the AP, so that the STA can communicate with another STA on the allocated time resource. Scheduled P2P is also referred to as scheduled (Scheduled) device-to-device (device-to-device, D2D). It should be understood that concepts of scheduled P2P and scheduled D2D are equivalent, and both mean that a plurality of stations directly exchange data without forwarding through an AP. Refer to FIG. 5. FIG. 5 is a schematic diagram of a scheduled P2P scenario. As shown in FIG. 5, an AP is associated with a STA1, and the AP may be or may not be associated with a STA2. A P2P link is established between the STA1 and the STA2. The AP may allocate a time resource to the STA1, so that the STA1 communicates with the STA2 over the P2P link on the allocated time resource.

Figure 6:
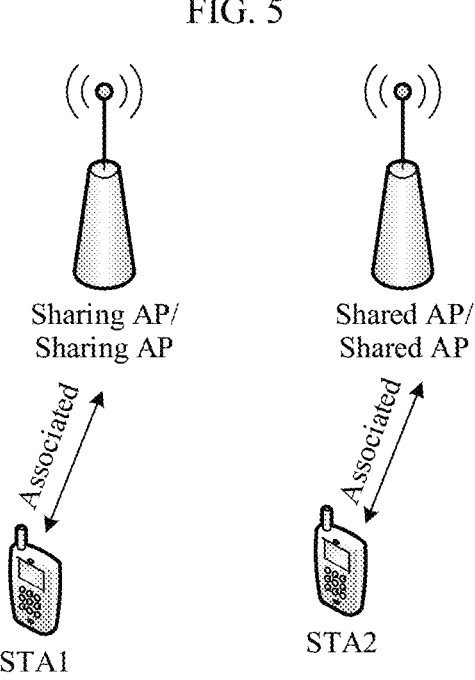
FIG. 6 is a schematic diagram of a Co-TDMA scenario.

Co-TDMA is a form of multi-AP coordination. A design principle of Co-TDMA is as follows: After obtaining a TXOP through contention, an AP (usually referred to as a sharing AP) may allocate a part of time resources to another AP (usually referred to as a shared AP), so that the another AP (that is, the shared AP) can communicate with a station associated with the shared AP on the allocated time resource. Refer to FIG. 6. FIG. 6 is a schematic diagram of a Co-TDMA scenario. As shown in FIG. 6, a STA1 is associated with a sharing AP, and a STA2 is associated with a shared AP. After obtaining a TXOP, the sharing AP allocates a time resource to the shared AP, so that the shared AP communicates with the STA2 associated with the shared AP on the time resource.

The TXOP is a basic unit for radio channel access. The TXOP is continuous duration, and is indicated by using a duration field. A station that obtains a TXOP may not perform channel contention again within duration of the TXOP, and continuously use the channel to transmit a plurality of data frames. The TXOP may be obtained through contention or hybrid coordinator (hybrid coordinator, HC) allocation. A TXOP obtained through contention may be referred to as an enhanced distributed channel access (enhanced distributed channel access, EDCA) TXOP. A TXOP obtained through HC allocation may be referred to as a hybrid coordination function controlled channel access (hybrid coordination function controlled channel access, HCCA) TXOP. It should be understood that a manner of obtaining the TXOP in this application is common sense of persons skilled in the art.

To support time resource allocation in a scheduled P2P scenario and a Co-TDMA scenario, the scheduled P2P scenario and the Co-TDMA scenario also need a single-user trigger frame (single user trigger frame, SU TF). It should be understood that the single-user trigger frame in the scheduled P2P scenario and the Co-TDMA scenario is used to allocate a time resource to a target station (the target station herein refers to a station in a broad sense, which may be an access point station "AP", or a non-access point station "STA"). The single-user trigger frame may be further used to trigger a single STA to respond in a single-user physical layer protocol data unit (single user physical protocol data unit, SU PPDU) manner. It should be understood that the single-user PPDU is mainly used in a single-user scenario.

For example, refer to FIG. 7. FIG. 7 is a schematic diagram of applying a single-user trigger frame to a scheduled P2P scenario. As shown in FIG. 7, after obtaining a TXOP, an AP may use a part of time resources by itself, and then allocate all or a part of remaining time resources in the TXOP to a P2P station (for example, a STA1 in FIG. 7) by using a trigger frame (for example, a TF for P2P in FIG. 7). Therefore, on the allocated time resource, the STA1 may send a P2P PPDU (the P2P PPDU is a single-user PPDU) to a STA2, and the STA2 may send an acknowledgment (acknowledge, ACK) frame of the P2P PPDU to the STA1.

For example, refer to FIG. 8. FIG. 8 is a schematic diagram of applying a single-user trigger frame to a Co-TDMA scenario. As shown in FIG. 8, a TXOP is owned by an AP1. In FIG. 8, the AP1 allocates time resources in the TXOP to a plurality of APs by using a trigger frame (Trigger). However, in actual application, a more feasible manner is that after using up a part of the time resources, the AP1 sends a unicast trigger frame to an AP2, to allocate an unused part of the time resources to the AP2. After the AP2 uses up the allocated time resource, the AP1 sends a unicast trigger frame to an AP3, to allocate an unused part of the time resources to the AP3. By analogy, the AP1 may allocate the time resources in the TXOP to more APs.

Based on discussion of the 802.11be standard, it is a potential manner to design the single-user trigger frame by using a multi-user (multiple user, MU) request-to-send (request to send, RTS) frame. However, there are two unresolved problems: one is how to indicate that the MU-RTS frame is a single-user trigger frame (referred to as a modified MU-RTS frame (modified MU-RTS frame) in this application) rather than a basic MU-RTS; and the other is how to indicate time duration allocated to a target station (the target station herein refers to a station in a broad sense, which may be an access point station "AP", or a non-access point station "STA").

Therefore, an embodiment of this application provides a time resource allocation and receiving method. A currently sent media access control (media access control, MAC) frame is indicated implicitly or explicitly as a single-user trigger frame, and may be distinguished from a basic/ original/conventional MU-RTS frame, so that a receive end respond correspondingly based on different received frames. In addition, a reserved subfield in the MU-RTS frame is used to indicate time duration allocated to a target station (that is, the second device in this application), so that the target station (that is, the second device in this application) can communicate with another station on the allocated time resource, to support communication in a scheduled P2P scenario and a Co-TDMA scenario.

The following describes in detail the technical solutions provided in this application with reference to more accompanying drawings.

The technical solutions provided in this application are described in detail by using two embodiments. Embodiment 1 describes implicitly indicating that a currently sent MAC frame is a single-user trigger frame, and describes how to indicate, under implicit indication, a time resource allocated to a target station (that is, the second device in this application). Embodiment 2 describes explicitly indicating that a currently sent MAC frame is a single-user trigger frame, and describes how to indicate, under explicit indication, a time resource allocated to a target station (that is, the second device in this application).

It may be understood that the first device in this application may be an AP, for example, the AP in FIG. 5 or the sharing AP in FIG. 6. The second device in this application may be a STA, for example, the STA1 in FIG. 5. Alternatively, the second device may be an AP, for example, the shared AP in FIG. 6.

It may be further understood that both the first device and the second device in this application support the 802.11be protocol (or referred to as Wi-Fi 7, EHT protocol), and may further support another WLAN communication protocol, for example, protocols such as 802.11ax and 802.11ac. It should be understood that the first device and the second device in this application may further support a next-generation protocol of 802.11be. In other words, the method provided in this application is applicable not only to the 802.11be protocol, but also to a next-generation 802.11be protocol.

Embodiment 1

Embodiment 1 of this application mainly describes how to implicitly indicate that a currently sent MAC frame is a single-user trigger frame when a single-user trigger frame is designed by using an MU-RTS frame, to distinguish from an original MU-RTS frame, and describes how to indicate a time resource allocated to a target station (that is, the second device in this application) under implicit indication.

Figure 9:
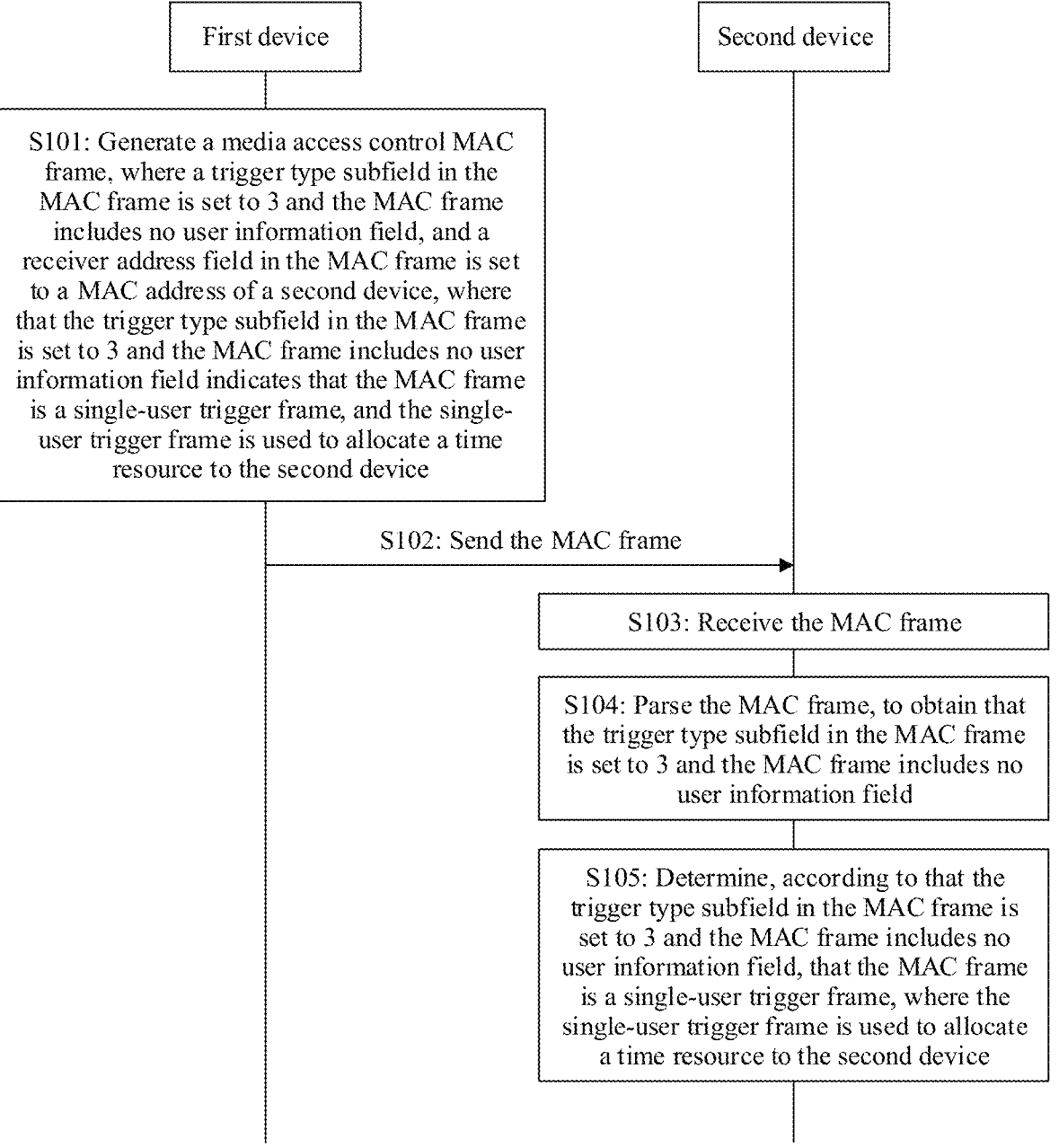
FIG. 9 is a schematic flowchart of a time resource allocation and receiving method according to an embodiment of this application.

Refer to FIG. 9. FIG. 9 is a schematic flowchart of a time resource allocation and receiving method according to an embodiment of this application. As shown in FIG. 9, the time resource allocation and receiving method includes but is not limited to the following steps.

S101: A first device generates a media access control MAC frame, where a trigger type subfield in the MAC frame is set to 3 and the MAC frame includes no user information field, and a receiver address field in the MAC frame is set to a MAC address of a second device. That the trigger type subfield in the MAC frame is set to 3 and the MAC frame includes no user information field indicates that the MAC frame is a single-user trigger frame, and the single-user trigger frame is used to allocate a time resource to the second device.

S102: The first device sends the MAC frame.

Optionally, that the trigger type subfield is set to 3 indicates an MU-RTS frame. Because the MU-RTS frame is sent to one or more users (or stations) and is used by the one or more users (or stations) to reply a clear-to-send (Clear to Send, CTS) frame on a specified resource unit (resource unit, RU), the MU-RTS frame necessarily includes one or more user information fields.

Figure 10:
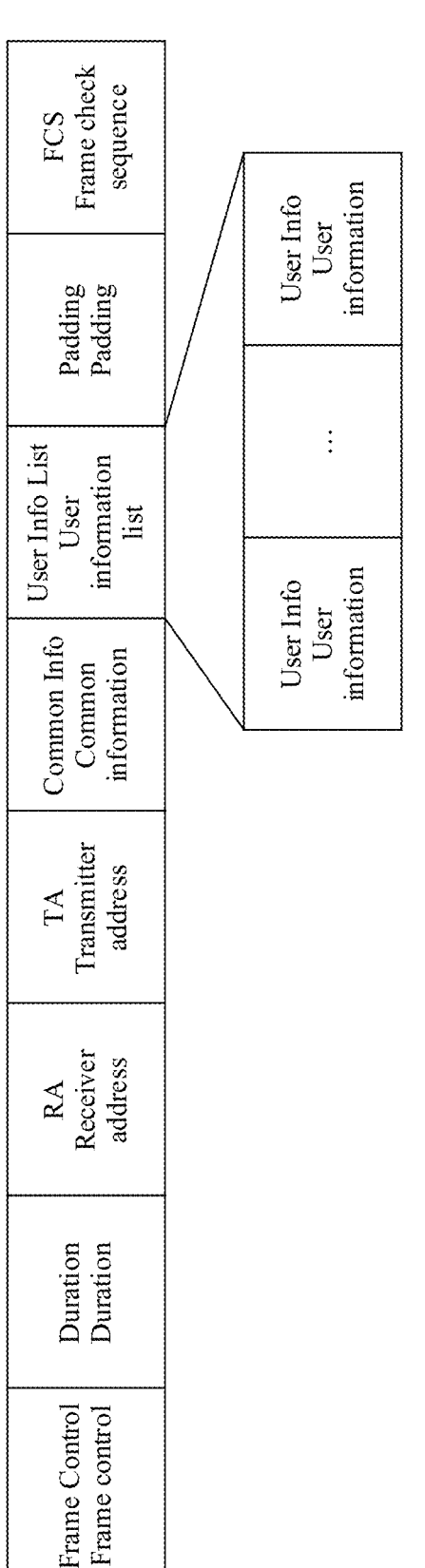
FIG. 10 is a schematic diagram of a frame format of an MU-RTS frame according to an embodiment of this application.

Refer to FIG. 10. FIG. 10 is a schematic diagram of a frame format of an MU-RTS frame according to an embodiment of this application. As shown in FIG. 10, the MU-RTS frame includes a frame control (frame control) field, a duration (duration) field, a receiver address (receiver address, RA) field, a transmitter address (transmitter address, TA) field, a common information (common information) field, a user information list (user information list) field, a padding (padding) field, and a frame check sequence (frame check sequence, FCS) field. The frame control field indicates that the frame is a trigger frame (trigger frame). The duration field indicates remaining time duration in a TXOP. The RA field and the TA field respectively indicate a receiver address and a transmitter address. The common information (common info for short) field includes common information that all target STAs need to interpret. The user information list field includes one or more user information fields, and each user information field corresponds to a station.

Figure 11A:
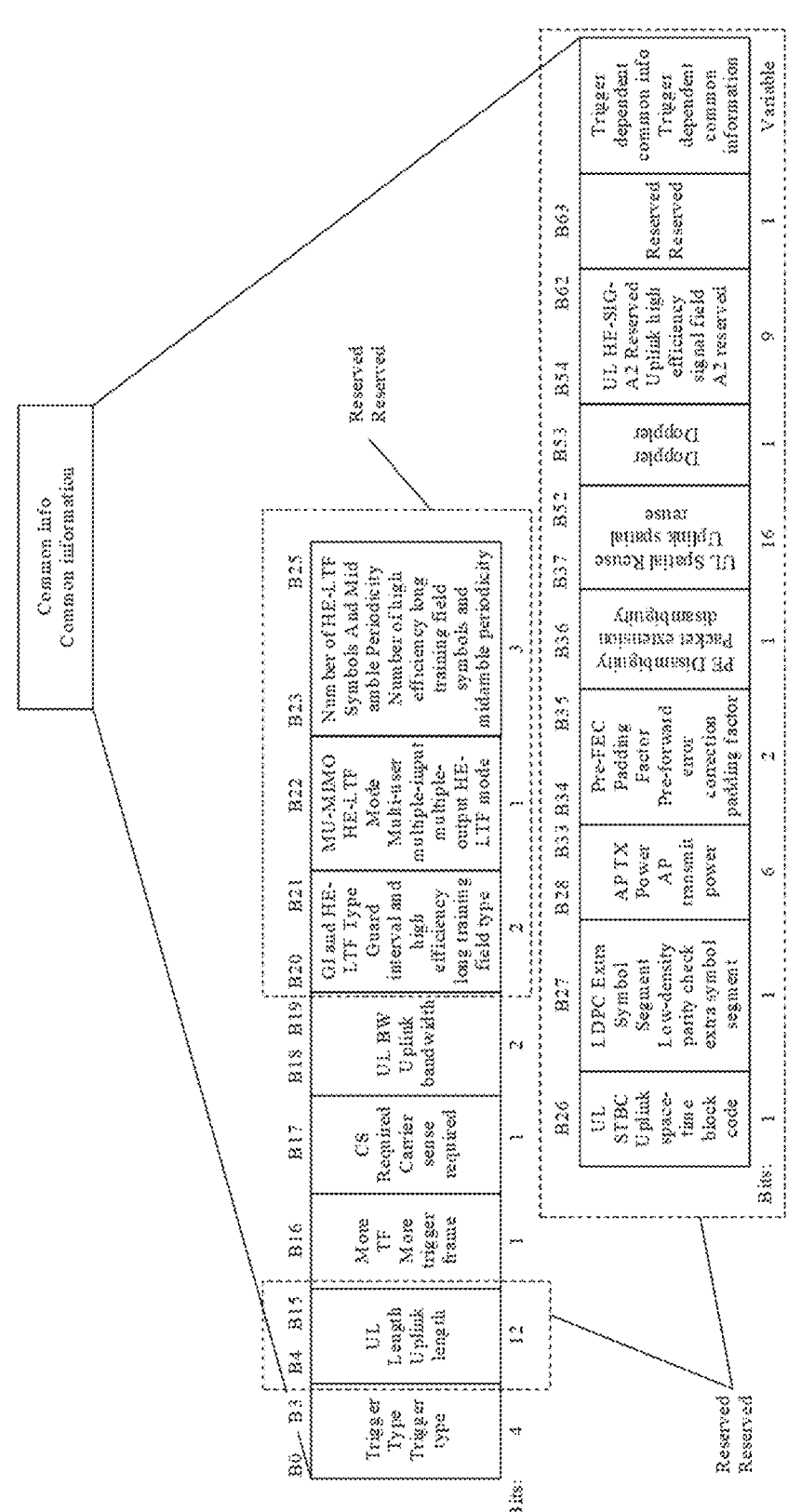
FIG. 11*a* is a schematic diagram of a frame format of a common information field in an MU-RTS frame according to an embodiment of this application.

Refer to FIG. 11a. FIG. 11a is a schematic diagram of a frame format of a common information field in an MU-RTS frame according to an embodiment of this application. As shown in FIG. 11a, a trigger type (trigger type) subfield in the common information field indicates a specific MU-RTS trigger frame type of the current frame, that is, the trigger type subfield is set to 3 (B0 to B3 are denoted as 0010). The following subfields in the common info field of the MU-RTS frame are reserved (that is, the following fields are not used in the MU-RTS frame): an uplink length (UL Length) subfield, a guard interval (guard interval, GI) and high efficiency long training field (high efficiency long training field, HE-LTF) type (GI And HE-LTF Type) subfield, a multi-user multiple input multiple output (multiple input, multiple output, MIMO) HE-LTF mode (MU-MIMO HE-LTF Mode) subfield, a number of HE-LTF symbols and midamble periodicity (Number Of HE-LTF Symbols And Midamble Periodicity) subfield, an uplink space-time block code (UL STBC) subfield, a low-density parity check code (low-density parity check, LDPC) extra symbol segment (LDPC Extra Symbol Segment) subfield, an AP transmit power (AP TX Power) subfield, a pre-forward error correction (forward error correction, FEC) padding factor (Pre-FEC padding factor) field, a packet extension (packet extension, PE) disambiguity (PE disambiguity) subfield, an uplink spatial reuse (UL spatial reuse) subfield, a doppler (Doppler) subfield, and an uplink high efficiency signal field A2 reserved (UL HE-SIG-A2 Reserved) subfield. In other words, these subfields in the common info field are not used or not defined in the MU-RTS frame, and are in a reserved state. In other words, none of B4 to B15 and B20 to B62 in the common info field of the MU-RTS frame is used or defined.

Figure 11B:
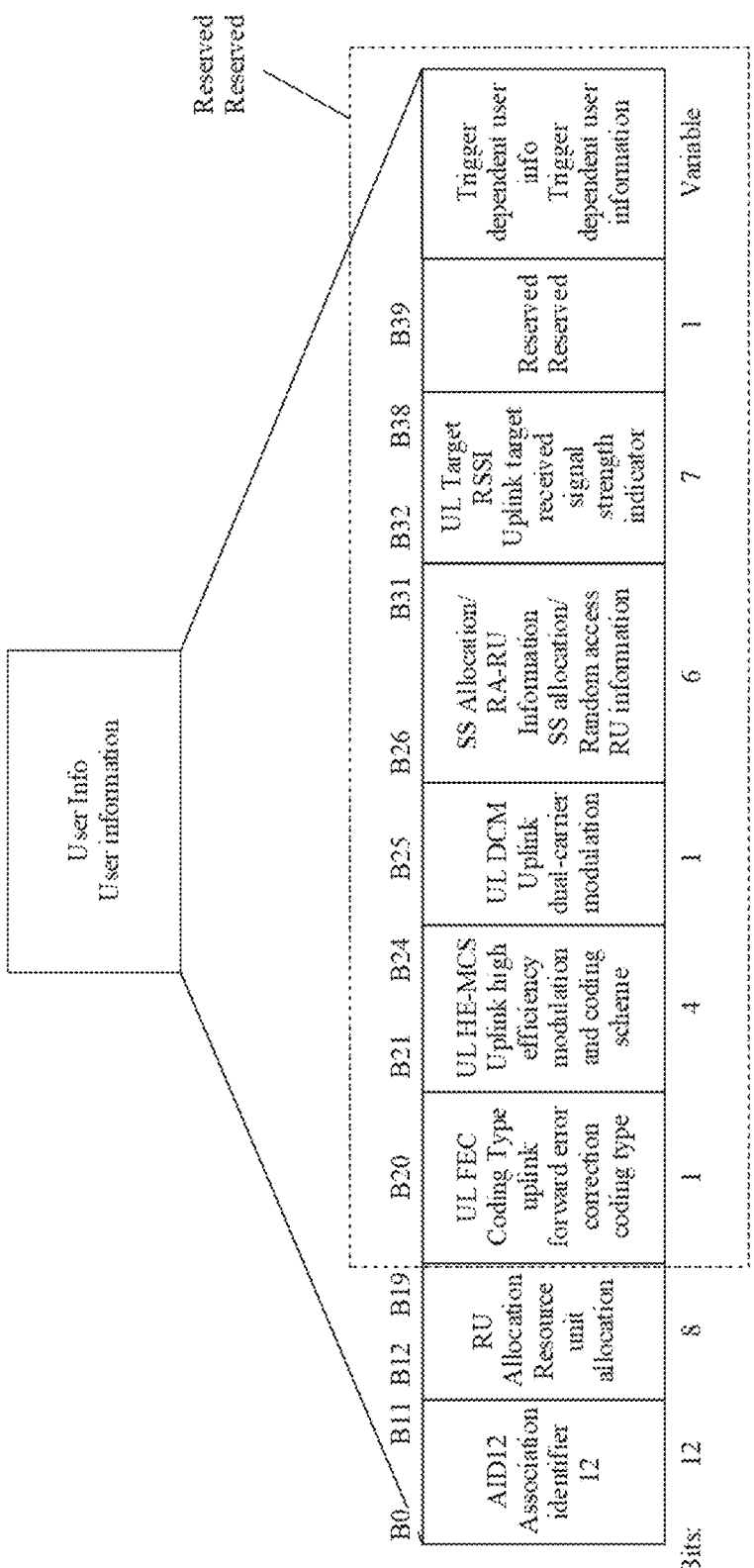
FIG. 11*b* is a schematic diagram of a frame format of a user information field in an MU-RTS frame according to an embodiment of this application.

Refer to FIG. 11b. FIG. 11b is a schematic diagram of a frame format of a user information field in an MU-RTS frame according to an embodiment of this application. As shown in FIG. 11b, an association identifier (Association Identifier, AID) 12 subfield in the user information (user info for short) field indicates the last 12 bits of an AID of a station, and an RU allocation (allocation) subfield indicates a frequency resource allocated to the station. The following subfields in the user info field of the MU-RTS frame are also reserved (that is, the following fields are not used in the MU-RTS frame): an uplink high efficiency modulation and coding scheme (UL HE-MCS) subfield, an uplink forward error correction coding type (UL FEC Coding Type) subfield, an uplink dual-carrier modulation (UL DCM) subfield, a spatial stream allocation (SS Allocation)/random access resource unit information (RA-RU Information) subfield, and an uplink target received signal strength indicator (UL Target RS SI) subfield. In other words, these subfields in the user info field are not used or not defined in the MU-RTS frame, and are in a reserved state. In other words, none of B20 to B38 in the user info field of the MU-RTS frame is used or defined.

In this embodiment of this application, it is considered that a single-user trigger frame in a scheduled P2P scenario and a Co-TDMA scenario is designed based on an MU-RTS frame. Therefore, a problem that needs to be first resolved is how to enable a receive end to identify that a currently received frame is a single-user trigger frame rather than an MU-RTS frame.

Therefore, the first device generates a MAC frame. A trigger type subfield in the MAC frame is set to 3 and the MAC frame includes no user information field, indicating that the MAC frame is a single-user trigger frame. The single-user trigger frame (that is, the MAC frame) is used to allocate a time resource to the second device. In other words, the MAC frame is a single-user trigger frame whose trigger type subfield is set to 3 and that includes no user information field. The MU-RTS frame necessarily includes a user information field. In this embodiment of this application, the trigger type subfield of the MAC frame is set to 3 (indicating an MU-RTS frame) and the MAC frame includes no user information field, to indicate that the MAC frame is a single-user trigger frame rather than an MU-RTS frame. The single-user trigger frame (that is, the MAC frame) in this application may also be referred to as a modified MU-RTS frame (modified MU-RTS frame), a new MU-RTS frame (new MU-RTS frame), a single-user RTS frame (SU-RTS frame), a single-user MU-RTS frame (SU MU-RTS frame), or the like. A name of the single-user trigger frame is not limited in this embodiment of this application. In other words, when the trigger type field in the MAC frame is set to 3 and no user information field exists, the MAC frame is a modified MU-RTS frame. For ease of distinguishing from an original MU-RTS frame, the single-user trigger frame is referred to as a modified MU-RTS frame (that is, a modified MU-RTS frame) below.

A modified MU-RTS frame (or a single-user trigger frame) includes no user information field, and the modified MU-RTS frame (or the single-user trigger frame) is sent only to a single user. Therefore, a receiver address field in the modified MU-RTS frame (or the single-user trigger frame) may be set to a MAC address (media access control address, literally referred to as media access control address, also referred to as local area network address (LAN Address), MAC address, Ethernet address (Ethernet Address), or a physical address (physical address)) of the second device, so that the second device can receive and parse the frame.

Figure 12:
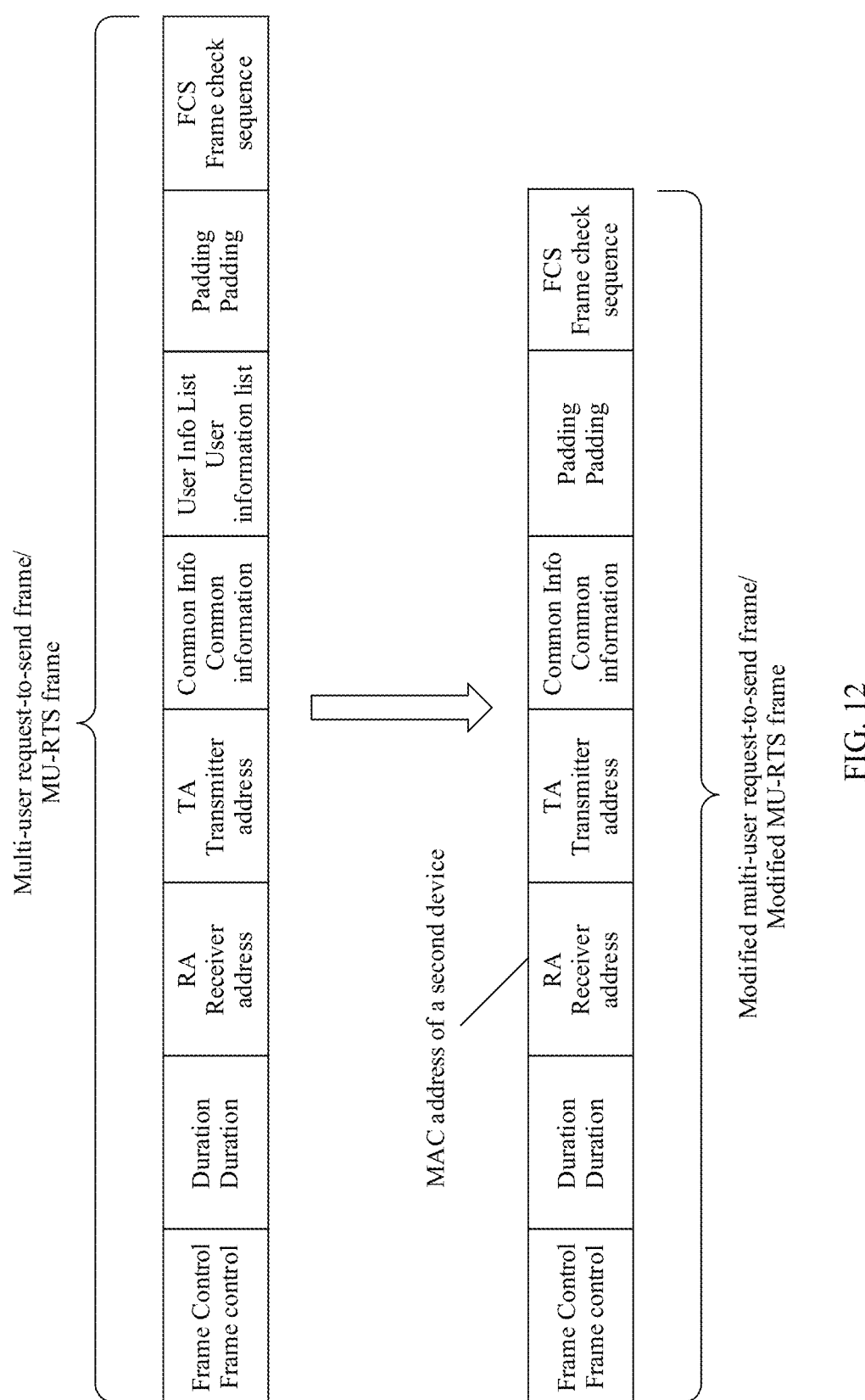
FIG. 12 is a schematic diagram of a frame format of a modified MU-RTS frame (or a single-user trigger frame) according to an embodiment of this application.

Refer to FIG. 12. FIG. 12 is a schematic diagram of a frame format of a modified MU-RTS frame (or a single-user trigger frame) according to an embodiment of this application. As shown in FIG. 12, the modified MU-RTS frame includes a frame control field, a duration field, a receiver address field, a transmitter address field, a common information field, a padding field, and a frame check sequence field. Compared with the frame format of the MU-RTS frame (shown in FIG. 10), the frame format of the modified MU-RTS frame (shown in FIG. 12) includes no user information list field, that is, includes no user information field, and the receiver address field of the modified MU-RTS frame is set to the MAC address of the second device.

Optionally, the duration field in the modified MU-RTS frame (or the single-user trigger frame) may indicate time duration allocated to the second device. Because an original meaning of the duration field indicates information about remaining duration of a current TXOP, reusing the duration field to indicate the time duration allocated to the second device is equivalent to allocating all the remaining duration of the entire TXOP to the second device. It can be learned that in this embodiment of this application, an original duration field in the modified MU-RTS frame (or the single-user trigger frame) is reused, and a meaning of the original duration field is extended, so that the duration field has two meanings (one indicates information about remaining duration of a current TXOP, and the other indicates time duration allocated to the second device), and the second device can communicate with another station on the allocated time resource without adding a new field, to support communication in a scheduled P2P scenario and a Co-TDMA scenario. Implementation is simple.

Optionally, the modified MU-RTS frame (or the single-user trigger frame) includes a first subfield, and the first subfield indicates time duration allocated to the second device. In other words, the first subfield indicates time duration allocated for single-user transmission. It should be understood that the first subfield is different from the duration field. The time duration allocated to the second device and indicated by the first subfield is a period of time within remaining duration of the TXOP. It can be learned that in this embodiment of this application, a new field is designed in the modified MU-RTS frame (or the single-user trigger frame) to indicate the time duration allocated to the second device, and a meaning of the new field is clear and explicit.

Optionally, it can be learned from FIG. 11a that the common information field of the MU-RTS frame includes a plurality of reserved subfields. Therefore, the first subfield may be a reserved subfield in the common information field of the modified MU-RTS frame (or the single-user trigger frame). A length of the first subfield may be shorter than or equal to a length of the duration field. For example, the first subfield has a length of 12 bits and is located at B20 to B31 of the common information field in the modified MU-RTS frame. Alternatively, the first subfield has a length of 16 bits and is located at B20 to B35 of the common information field in the modified MU-RTS frame. It can be learned that in this embodiment of this application, a reserved subfield in the common information field of the modified MU-RTS frame (or the single-user trigger frame) is used to design the first subfield, without adding a new field. An original frame length is maintained, so that the reserved subfield in the common information field can be fully used, and a meaning of the first subfield is clear and explicit. In addition, when the length of the first subfield is 12 bits, the length is the same as a length of the UL length subfield, and the UL length subfield may be reused to indicate a duration granularity. When the length of the first subfield is 16 bits, the length is the same as a length of the duration field, and the duration field may be reused to indicate a duration granularity.

Optionally, the first subfield may be the uplink length subfield reserved in the common information field of the modified MU-RTS frame (or the single-user trigger frame). In other words, the UL length subfield in the modified MU-RTS frame is used to indicate duration allocated to a target station (herein referred to as the second device in this application).

It can be learned that a UL length subfield in another type of trigger frame (a trigger frame whose value of the trigger type subfield is not 3) indicates a frame length (the frame length herein is time duration) of a triggered trigger-based PPDU (Trigger Based PPDU, TB PPDU), but the UL length subfield is not used or does not exist in the original MU-RTS frame. Therefore, in this embodiment of this application, the UL length subfield indicates the duration allocated to the second device, and the UL length subfield may be reused to indicate a duration granularity. Such function is similar to that of the UL length subfield.

Optionally, because the MU-RTS is allowed to be transmitted in a preamble puncturing mode, the modified MU-RTS frame (or the single-user trigger frame) in this embodiment of this application may also be transmitted in a preamble puncturing mode. Specifically, the modified MU-RTS frame (or the single-user trigger frame) may further include a third subfield. The third subfield indicates a preamble puncturing bandwidth mode, or the third subfield indicates a punctured subchannel in the preamble puncturing mode. The third subfield may be a reserved subfield in the common information field of the modified MU-RTS frame (or the single-user trigger frame), and the third subfield is different from the first subfield. A length of the third subfield may be 16 bits. It should be understood that B4 to B15 and B20 to B62 in the common info field of the modified MU-RTS frame (or the single-user trigger frame) are all reserved. Therefore, the third subfield and the first subfield may be respectively located at different bits of the common information field in the modified MU-RTS frame (or the single-user trigger frame). For example, the first subfield is located at B4 to B15 of the common information field, and the third subfield may be located at B20 to B35 of the common information field.

Figure 13:
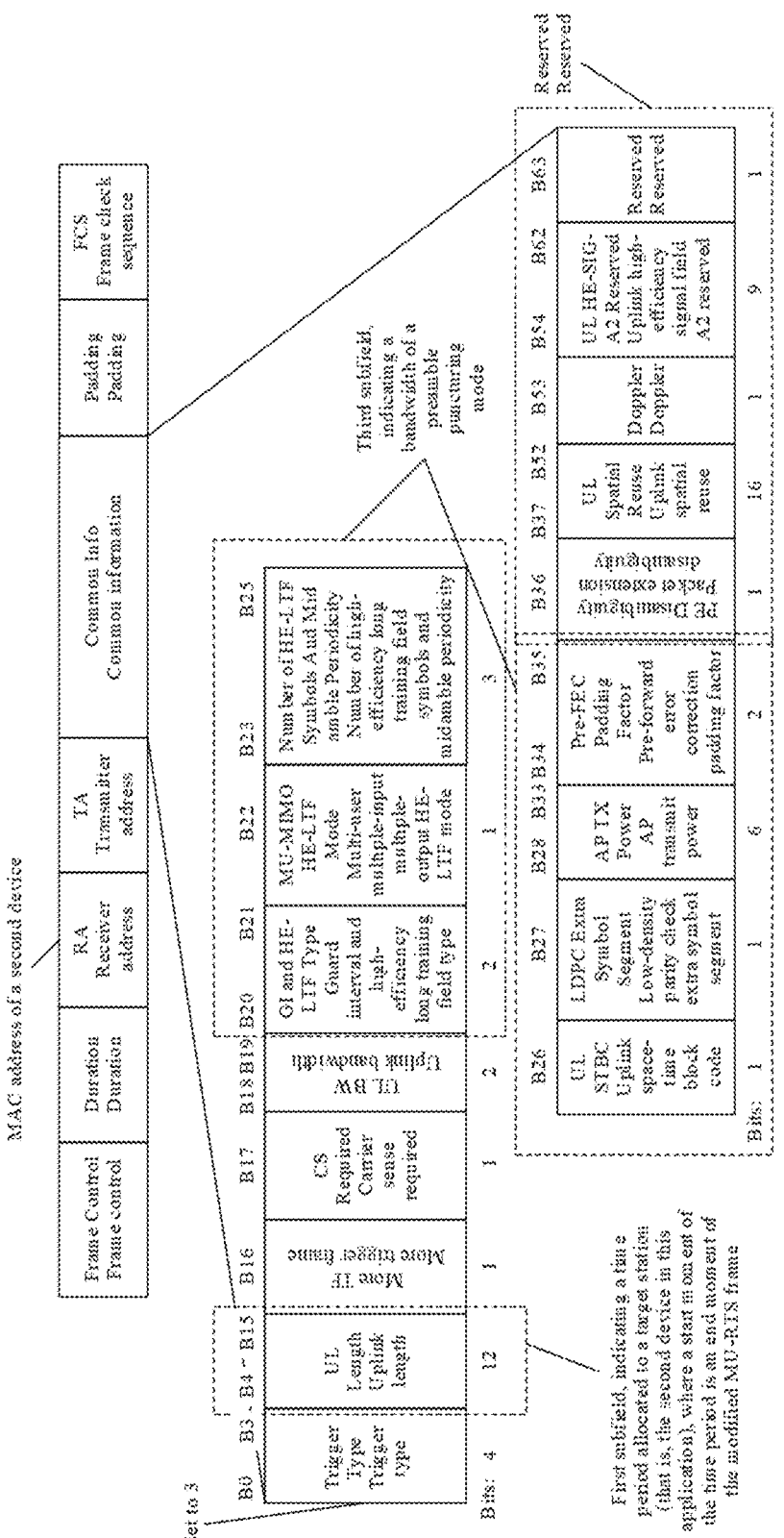
FIG. 13 is a schematic diagram of a frame format of a common information field in a modified MU-RTS frame (or a single-user trigger frame) according to an embodiment of this application.

Refer to FIG. 13 for an example. FIG. 13 is a schematic diagram of a frame format of a common information field in a modified MU-RTS frame (or a single-user trigger frame) according to an embodiment of this application. As shown in FIG. 13, a receiver address field in the modified MU-RTS frame is set to the MAC address of the second device and no user information list field is included. A trigger type subfield in the common information field of the modified MU-RTS frame is set to 3. AUL length subfield (namely, the first subfield) in the common information field of the modified MU-RTS frame indicates a time period allocated to a target station (namely, the second device in this application), and a start moment of the time period is an end moment of the modified MU-RTS frame. B20 to B35 (namely, the third subfield) in the common information field of the modified MU-RTS frame indicate a preamble puncturing bandwidth mode. B36 to B63 in the common information field of the modified MU-RTS frame are still reserved.

Optionally, the modified MU-RTS frame may not only be used to allocate a time resource to the second device, but also have a basic function of the MU-RTS frame, that is, have a function of requesting for a CTS frame. In other words, the modified MU-RTS frame has two functions. One is to allocate a time resource to the second device for single-user transmission, and the other is to request for a CTS frame from the second device. However, whether the second device needs to feed back a CTS frame in this interaction process may be indicated by the first device in the modified MU-RTS frame. In other words, if the first device requires the second device to send a CTS frame, the second device should send a CTS frame. If the first device does not require the second device to send a CTS, the second device may send a CTS frame (the second device may choose to send a CTS frame or skip sending a CTS frame).

S103: The second device receives the MAC frame.

S104: The second device parses the MAC frame, to obtain that the trigger type subfield in the MAC frame is set to 3 and the MAC frame includes no user information field.

S105: The second device determines, according to that the trigger type subfield in the MAC frame is set to 3 and the MAC frame includes no user information field, that the MAC frame is a single-user trigger frame, where the single-user trigger frame is used to allocate a time resource to the second device.

Optionally, after receiving the MAC frame, the second device parses the MAC frame to obtain that the trigger type subfield in the MAC frame is set to 3 and the MAC frame includes no user information field. The second device determines, according to that the trigger type subfield in the MAC frame is set to 3 and the MAC frame includes no user information field, that the MAC frame is a single-user trigger frame (or a modified MU-RTS frame), where the single-user trigger frame is used to allocate a time resource to the second device. In other words, when a trigger type subfield received by the second device indicates an MU-RTS frame, if the frame carries one or more user information fields (whether the user information field is included is determined by using a frame length), it is determined that the frame is an MU-RTS frame. If the frame carry no user information field, it is determined that the frame is a single-user trigger frame (or a modified MU-RTS frame).

In other words, the second device first receives a MAC frame, then determines that the MAC frame is a modified MU-RTS frame, and further determines that the modified MU-RTS frame includes a field indicating time duration for single-user transmission (although the field is in the MAC frame, a receiving station (that is, the second device) does not know about the field before determining a frame type).

Optionally, the single-user trigger frame may be further used to trigger a single station (a station in a broad sense herein, that is, an AP or a STA) to respond in an SU PPDU manner. Therefore, after determining that the MAC frame is a single-user trigger frame (or a modified MU-RTS frame), the second device sends an SU PPDU, where the SU PPDU is not a CTS frame.

Optionally, after determining that the MAC frame is a single-user trigger frame (or a modified MU-RTS frame), the second device sends a CTS frame, and then sends an SU PPDU, where the SU PPDU is not a CTS frame.

Optionally, after determining that the MAC frame is a single-user trigger frame (or a modified MU-RTS frame), the second device may continue to parse the MAC frame, to obtain a time resource allocated to the second device by using the single-user trigger frame (or the modified MU-RTS frame). The second device communicates with another station (a station in a broad sense herein, that is, an AP or a STA) on the allocated time resource.

It can be learned that, in this embodiment of this application, a trigger type subfield of a MAC frame is set to 3 (indicating an MU-RTS frame) and the MAC frame includes no user information field, to implicitly indicate that the MAC frame is a single-user trigger frame (or a modified MU-RTS frame) rather than an MU-RTS frame, so that the MAC frame can be distinguished from an original MU-RTS frame, and a receive end responds correspondingly based on different received frames. In addition, in this embodiment of this application, a reserved subfield in a common information field of an MU-RTS frame is used to indicate time duration allocated to a target station (that is, the second device in this application), so that the target station (that is, the second device in this application) can communicate with another station on the allocated time resource, to support communication in a scheduled P2P scenario and a Co-TDMA scenario.

Embodiment 2

Embodiment 2 of this application mainly describes how to explicitly indicate that a currently sent MAC frame is a single-user trigger frame when a single-user trigger frame is designed by using an MU-RTS frame, to distinguish from an original MU-RTS frame, and describes how to indicate a time resource allocated to a target station (that is, the second device in this application) under explicit indication.

Figure 14:
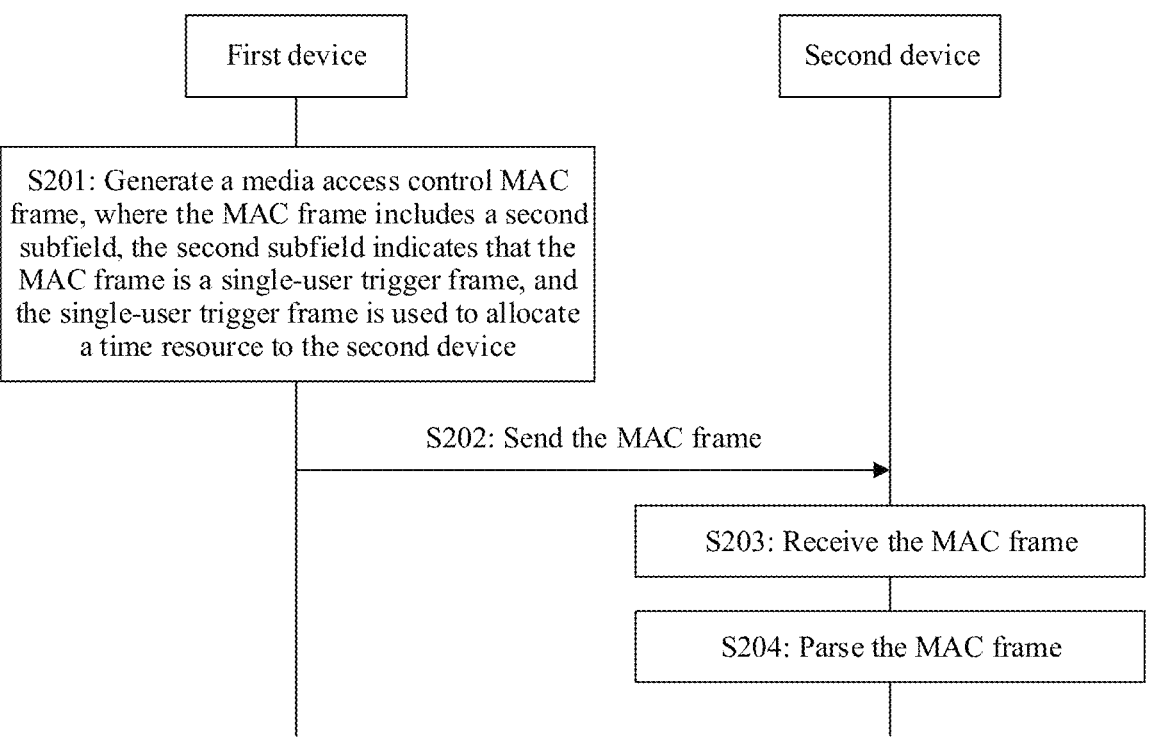
FIG. 14 is another schematic flowchart of a time resource allocation and receiving method according to an embodiment of this application.

Refer to FIG. 14. FIG. 14 is another schematic flowchart of a time resource allocation and receiving method according to an embodiment of this application. As shown in FIG. 14, the time resource allocation and receiving method includes but is not limited to the following steps.

S201: A first device generates a media access control MAC frame, where the MAC frame includes a second subfield, the second subfield indicates that the MAC frame is a single-user trigger frame, and the single-user trigger frame is used to allocate a time resource to a second device.

S202: The first device sends the MAC frame.

Optionally, the first device generates a MAC frame, where the MAC frame includes a second subfield, the second subfield indicates that the MAC frame is a single-user trigger frame, and the single-user trigger frame is used to allocate a time resource to a second device. A trigger type subfield in the MAC frame is set to 3. It should be understood that when the trigger type subfield is set to 3, it indicates an MU-RTS frame. The second subfield in the MAC frame indicates that the MAC frame is a single-user trigger frame rather than an MU-RTS frame. Therefore, in this embodiment of this application, the single-user trigger frame is referred to as a modified MU-RTS frame or may have other names, for example, a new MU-RTS frame, an SU-RTS frame, and an SU MU-RTS frame. This is not limited in this embodiment of this application.

Optionally, a frame format of a modified MU-RTS frame may be the same as or different from the frame format of the MU-RTS frame (as shown in FIG. 10). If the modified MU-RTS frame includes a user information list field, the frame format of the modified MU-RTS frame is the same as that of the MU-RTS frame (as shown in FIG. 10), and includes a frame control field, a duration field, an RA field, a TA field, a common info field, a user information list field, a padding field, and an FCS field. The user information list field includes one or more user information fields. The modified MU-RTS frame may also include no user information list field, that is, includes no user information field. It should be understood that, if the modified MU-RTS frame includes no user information field, the receiver address field of the modified MU-RTS frame should be set to a MAC address of the second device.

The following describes in detail a specific implementation of the second subfield.

(1) The second subfield is an RU allocation (RU Allocation) subfield whose value is a first preset value in the user information field of the modified MU-RTS frame (or the single-user trigger frame). The RU allocation subfield has 8 bits, which are B0 to B7 respectively, and may represent values 0 to 255. In the 802.11ax standard, when the RU allocation field indicates a primary 20 MHz, a primary 40 MHz, or a primary 80 MHz channel, B0 is set to 0. When the RU allocation field indicates 160 MHz or 80+80 MHz, B0 is set to 1. B7 to B1 indicate a location of a specific RU that is allocated. Values 61 to 64 are used to respectively indicate four 20 MHz subchannels on a primary 80 MHz channel, values 65 and 66 are used to respectively indicate two 40 MHz subchannels on a primary 80 MHz channel, a value 67 is used to indicate a primary 80 MHz channel, and a value 68 is used to indicate a primary 80 MHz and a secondary 80 MHz (that is, a 160 MHz) channel. When a value of the RU allocation subfield is 0 to 60, it indicates an RU smaller than a 20 MHz bandwidth (242-tone). Therefore, values 0 to 60 are not used in the MU-RTS frame. In addition, B7 to B1 are in a reserved state when a value of B7-B1 is greater than 68, which is not defined in the 802.11ax standard. In the 802.11be standard, a bandwidth is extended to 320 MHz, and more RU combinations are supported. Therefore, the 802.11be standard may extend a manner of setting B1 to B7 and B0, that is, a parameter that is not defined is used for setting. Therefore, the first preset value is a value that is not used in the 802.11be standard and that is of values 0 to 60 and 68 to 255. In other words, a specific RU allocation value (that is, the first preset value) is used to indicate that a currently sent frame is a modified MU-RTS frame. The specific RU allocation value is a value that is not used to indicate a real RU in the 802.11ax standard and the 802.11be standard. For example, B0 to B7 of the RU allocation subfield are all set to 1 (indicating a decimal value 255).

It should be understood that, when the RU allocation subfield in the user information field of the modified MU-RTS frame (or the single-user trigger frame) is set to the first preset value, the RU allocation subfield cannot allocate a frequency resource to the station. In other words, the station may not know a frequency resource on which a CTS frame is fed back. However, the modified MU-RTS frame (or the single-user trigger frame) is sent to a single user. If the second device needs to feed back a CTS frame, the second device may set a bandwidth of the CTS frame to be the same as a bandwidth of the modified MU-RTS frame (or the single-user trigger frame). The bandwidth of the modified MU-RTS frame (or the single-user trigger frame) may be obtained from an uplink bandwidth subfield in a common information field. In other words, the RU allocation subfield in the user information field of the modified MU-RTS frame (or the single-user trigger frame) is no longer needed, and a bandwidth of a subsequent CTS frame (if needed) should be set to be the same as that of the modified MU-RTS frame (or the single-user trigger frame), and bandwidth information may be obtained from the UL BW subfield in the common information field.

It can be learned that in this embodiment of this application, the RU allocation subfield is reused, without changing meanings of some values of the RU allocation subfield, and a special value is used to indicate a modified MU-RTS frame (or a single-user trigger frame). A small change is made on an MU-RTS frame, facilitating compatibility with the 802.11ax standard.

(2) The second subfield is an AID12 subfield whose value is a second preset value in the user information field of the modified MU-RTS frame (or the single-user trigger frame). The second preset value is a reserved value (that is, an unused value), for example, one of 2008 to 2044 and 2047 to 4094.

It should be understood that an original meaning of the AID12 subfield indicates the last 12 bits of an AID of a station. When the AID subfield is set to the second preset value, the AID subfield cannot be used to identify the station. Therefore, in an implementation, the receiver address field of the modified MU-RTS frame (or the single-user trigger frame) may be set to the MAC address of the second device, to identify the station. In other words, the AID12 subfield in the user information field of the modified MU-RTS frame (or the single-user trigger frame) is no longer needed. Because the modified MU-RTS frame (or the single-user trigger frame) is sent to a single user, the RA address field may be used to carry a MAC address of a target station (that is, the second device in this application).

In another implementation, another subfield in the user information field whose AID subfield value is the second preset value is reused, to indicate an association identifier of the second device. For example, B12 to B23 in the user information field whose AID subfield value is the second preset value are used to indicate the association identifier of the second device. That is, in this implementation, the RU allocation subfield is no longer needed. Therefore, if the second device needs to feed back a CTS frame, the bandwidth of the CTS frame may be set to be the same as the bandwidth of the modified MU-RTS frame (or the single-user trigger frame).

It can be learned that in this embodiment of this application, the AID subfield is reused, without changing meanings of some values of the AID12 subfield, and a special value is used to indicate a modified MU-RTS frame (or a single-user trigger frame). A small change is made on an MU-RTS frame, facilitating compatibility with the 802.11ax standard. In addition, the AID12 subfield is the first subfield in the user information field. This can help the second device determine whether a received frame is a modified MU-RTS frame (or a single-user trigger frame) more quickly, so that the second device responds correspondingly more quickly.

(3) The second subfield is a reserved subfield in the user information field of the modified MU-RTS frame (or the single-user trigger frame). A value of the second subfield is different from a value of the second subfield in a reserved state. It can be learned from the foregoing FIG. 11*b* that, the user information field of the MU-RTS frame has a plurality of reserved subfields and one reserved bit (that is, B39). Therefore, one of these reserved subfields or the reserved bit may indicate that a currently sent MAC frame is a modified MU-RTS frame (or a single-user trigger frame). If the second subfield is set to 0 in a reserved state, when the second subfield is set to 0, it indicates that the MAC frame is an MU-RTS frame. When the second subfield is set to 1, it indicates that the MAC frame is a modified MU-RTS frame (or a single-user trigger frame). Vice versa, if the second subfield is set to 1 in a reserved state, when the second subfield is set to 1, it indicates that the MAC frame is an MU-RTS frame. When the second subfield is set to 0, it indicates that the MAC frame is a modified MU-RTS frame (or a single-user trigger frame).

It can be learned that in this embodiment of this application, a reserved subfield in the user information field is used to indicate a modified MU-RTS frame (or a single-user trigger frame). The meaning is clear and explicit, unlikely to cause confusion.

(4) The second subfield is a reserved subfield in the common information field of the modified MU-RTS frame (or the single-user trigger frame). A value of the second subfield is different from a value of the second subfield in a reserved state. It can be learned from the foregoing FIG. 11*a* that, the common information field of the MU-RTS frame has a plurality of reserved subfields and one reserved bit (that is, B63). Therefore, one of these reserved subfields or the reserved bit may indicate that a currently sent MAC frame is a modified MU-RTS frame (or a single-user trigger frame). If the second subfield is set to 0 in a reserved state, when the second subfield is set to 0, it indicates that the MAC frame is an MU-RTS frame. When the second subfield is set to 1, it indicates that the MAC frame is a modified MU-RTS frame (or a single-user trigger frame). Vice versa, if the second subfield is set to 1 in a reserved state, when the second subfield is set to 1, it indicates that the MAC frame is an MU-RTS frame. When the second subfield is set to 0, it indicates that the MAC frame is a modified MU-RTS frame (or a single-user trigger frame).

It can be learned that in this embodiment of this application, a reserved subfield in the common information field is used to indicate a modified MU-RTS frame (or a single-user trigger frame). The meaning is clear and explicit, unlikely to cause confusion. In addition, the common information field is located after the transmitter address field. This can help the second device determine whether a received frame is a modified MU-RTS frame (or a single-user trigger frame) more quickly, so that the second device responds more quickly.

Optionally, the MAC frame indicates, by using the second subfield, that the MAC frame is a single-user trigger frame, and the single-user trigger frame is used to allocate a time resource to the second device. Therefore, the modified MU-RTS frame (or the single-user trigger frame) needs to carry a time duration indication field, to indicate time duration allocated by an AP (that is, the first device in this application) to a target station (that is, the second device in this application). It should be understood that the MU-RTS frame includes two fields related to time duration: one is the duration field, and the other is the UL length subfield. The duration field indicates information about remaining duration of a current TXOP. A UL length subfield in another type of trigger frame (a trigger frame whose value of the trigger type subfield is not 3) indicates a frame length of a triggered trigger-based PPDU (Trigger Based PPDU, TB PPDU). Although the MU-RTS frame is one type of trigger frame, the MU-RTS does not trigger a TB PPDU, but triggers a CTS frame in a non-high throughput (non-high throughput, non-HT) or a non-high throughput duplicate (non-HT duplicated) format, and sending duration of the CTS frame is fixed. Therefore, the UL length subfield in the MU-RTS frame is reserved and not used.

Optionally, the duration field in the modified MU-RTS frame (or the single-user trigger frame) may indicate time duration allocated to the second device. Because an original meaning of the duration field indicates information about remaining duration of a current TXOP, reusing the duration field to indicate the time duration allocated to the second device is equivalent to allocating all the remaining duration of the entire TXOP to the second device.

Optionally, the MAC frame may further include a first subfield, and the first subfield indicates time duration allocated to the second device. In other words, the first subfield indicates time duration allocated for single-user transmission. It should be understood that the first subfield is different from the duration field, and the first subfield is also different from the second subfield. The time duration allocated to the second device and indicated by the first subfield is a period of time within remaining duration of the TXOP. The following describes in detail two implementations of the first subfield.

In a first implementation, it can be learned from FIG. 11*a* that the common information field of the MU-RTS frame includes a plurality of reserved subfields. Therefore, the first subfield may be a reserved subfield in the common information field of the modified MU-RTS frame (or the single-user trigger frame). A length of the first subfield may be shorter than or equal to a length of the duration field. For example, the first subfield has a length of 12 bits and is located at B20 to B31 of the common information field in the modified MU-RTS frame. Alternatively, the first subfield has a length of 16 bits and is located at B20 to B35 of the common information field in the modified MU-RTS frame.

Optionally, the first subfield may be the uplink length subfield reserved in the common information field of the modified MU-RTS frame (or the single-user trigger frame). In other words, the UL length subfield in the modified MU-RTS frame is used to indicate duration allocated to a target station (herein referred to as the second device in this application).

In a second implementation, it can be learned from FIG. 11*b* that the user information field of the MU-RTS frame includes a plurality of reserved subfields. Therefore, the first subfield may be a reserved subfield in the user information field of the modified MU-RTS frame (or the single-user trigger frame). A length of the first subfield may be shorter than or equal to a length of the duration field. For example, the first subfield has a length of 12 bits and is located at B20 to B31 of the user information field in the modified MU-RTS frame. Alternatively, the first subfield has a length of 16 bits and is located at B20 to B35 of the user information field in the modified MU-RTS frame.

Figure 15A:
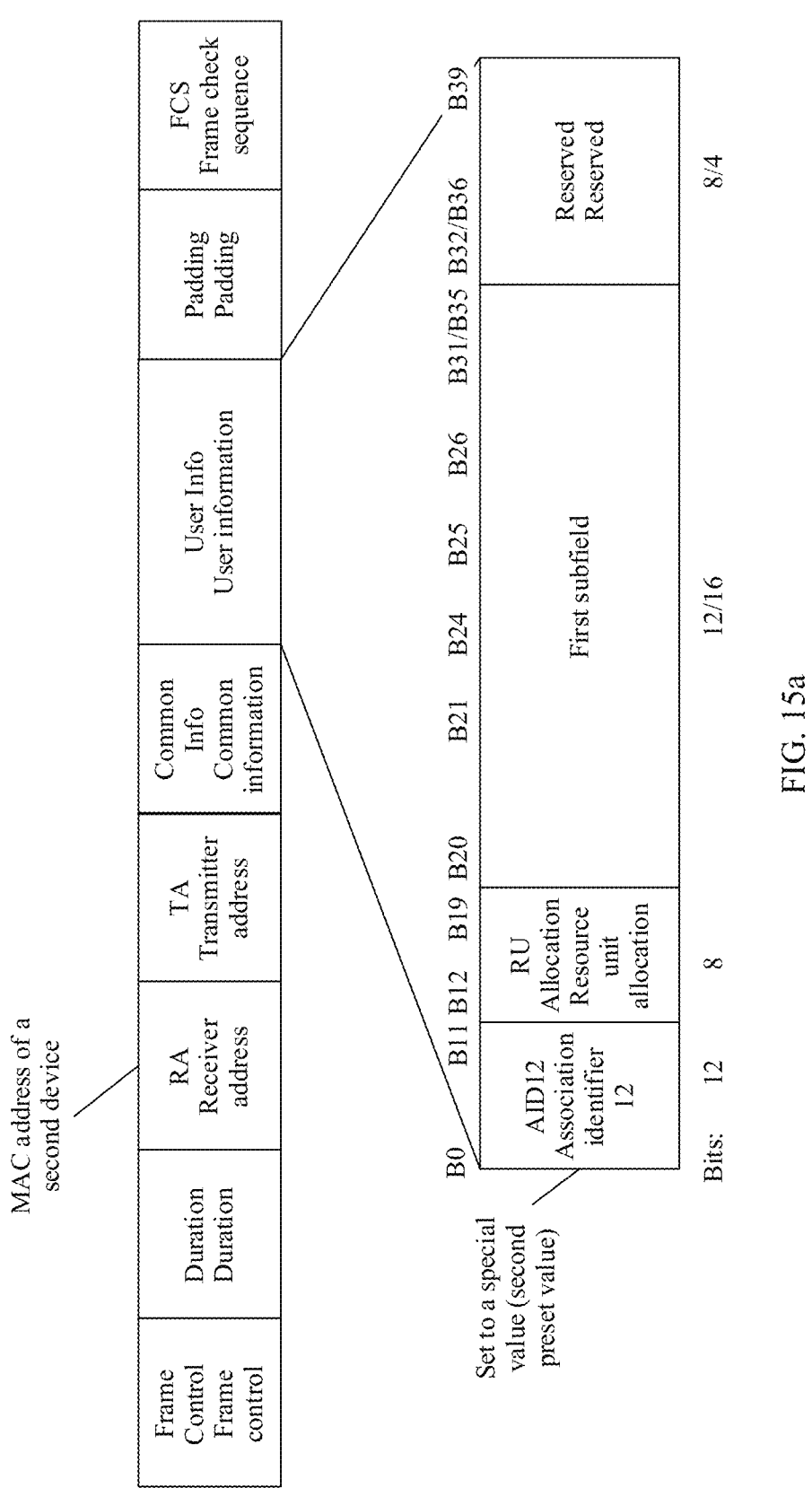
FIG. 15*a* is a schematic diagram of a frame format of a first subfield and a second subfield in a user information field of a modified MU-RTS frame according to an embodiment of this application.

Refer to FIG. 15*a* for an example. FIG. 15*a* is a schematic diagram of a frame format of a first subfield and a second subfield in a user information field of a modified MU-RTS frame according to an embodiment of this application. As shown in FIG. 15*a*, the second subfield is an AID12 subfield that is in the user information field of the modified MU-RTS frame and that is set to a special value (that is, the foregoing second preset value). A receiver address field of the modified MU-RTS frame is set to the MAC address of the second device. The first subfield is a reserved subfield in the user information field of the modified MU-RTS frame, and has a length of 12 bits (B20 to B31) or 16 bits (B20 to B35).

Figures 15B, 15C:
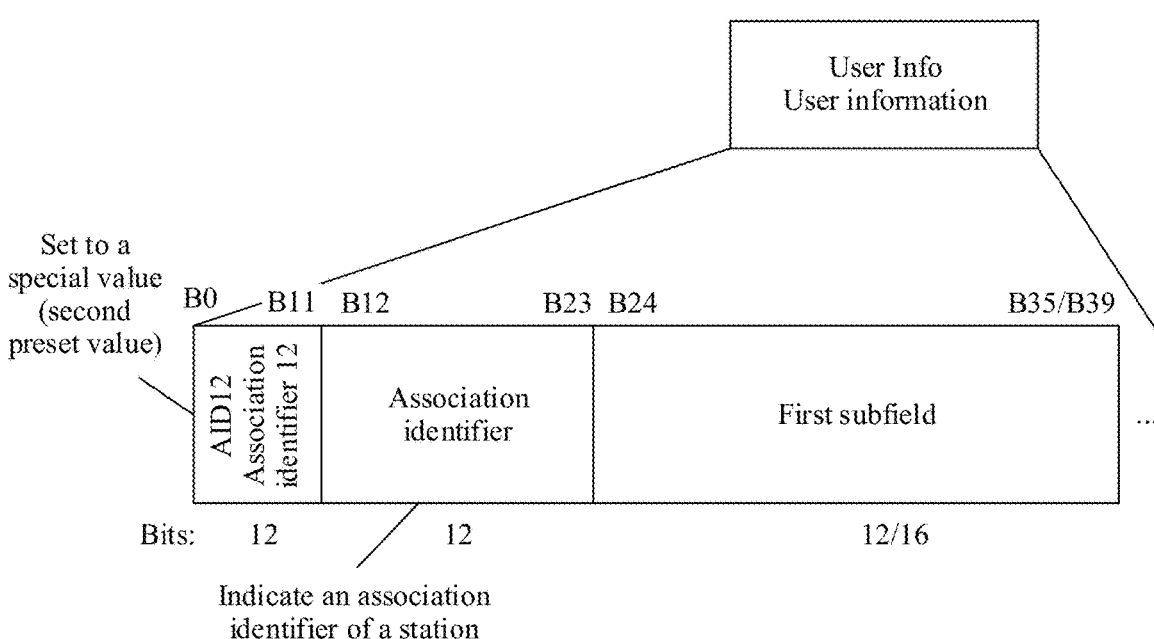
FIG. 15*b* is a schematic diagram of another frame format of a first subfield and a second subfield in a user information field of a modified MU-RTS frame according to an embodiment of this application.
FIG. 15*c* is a schematic diagram of still another frame format of a first subfield and a second subfield in a user information field of a modified MU-RTS frame according to an embodiment of this application.

Refer to FIG. 15*b* for another example. FIG. 15*b* is a schematic diagram of another frame format of a first subfield and a second subfield in a user information field of a modified MU-RTS frame according to an embodiment of this application. As shown in FIG. 15*b*, the second subfield is an AID12 subfield that is in the user information field of the modified MU-RTS frame and that is set to a special value (that is, the foregoing second preset value). B12 to B23 in the user information field of the modified MU-RTS frame indicate an association identifier of a station. The first subfield is a reserved subfield in the user information field of the modified MU-RTS frame, and has a length of 12 bits (B24 to B35) or 16 bits (B24 to B39).

Refer to FIG. 15*c* for still another example. FIG. 15*c* is a schematic diagram of still another frame format of a first subfield and a second subfield in a user information field of a modified MU-RTS frame according to an embodiment of this application. As shown in FIG. 15*c*, the second subfield is an RU allocation subfield that is in the user information field of the modified MU-RTS frame and that is set to a special value (that is, the foregoing first preset value, that is, a special value that is not used for RU allocation in 802.11ax and 802.11be). The first subfield is a reserved subfield in the user information field of the modified MU-RTS frame, and has a length of 12 bits (B20 to B31) or 16 bits (B20 to B35).

It should be understood that if both the first subfield and the second subfield are located in the common information field of the modified MU-RTS frame (or the single-user trigger frame), the modified MU-RTS frame (or the single-user trigger frame) may include no user information list field, that is, may include no user information field. The modified MU-RTS frame (or the single-user trigger frame) may also include one or more user information fields. It should be further understood that the modified MU-RTS frame (or the single-user trigger frame) herein includes no user information field. This is merely intended to shorten a frame length, and has a meaning different from that in the foregoing Embodiment 1.

Optionally, because the MU-RTS is allowed to be transmitted in a preamble puncturing mode, the modified MU-RTS frame (or the single-user trigger frame) in this embodiment of this application may also be transmitted in a preamble puncturing mode. Specifically, the modified MU-RTS frame (or the single-user trigger frame) may further include a third subfield. The third subfield indicates a preamble puncturing bandwidth mode, or the third subfield indicates a punctured subchannel in the preamble puncturing mode. The third subfield may be a reserved subfield in the common information field of the modified MU-RTS frame (or the single-user trigger frame), and the third subfield is different from the first subfield and the second subfield above. A length of the third subfield may be 16 bits.

It should be understood that B4 to B15 and B20 to B62 in the common info field of the modified MU-RTS frame (or the single-user trigger frame) are all reserved. Therefore, the third subfield, the first subfield, and the second subfield may be respectively located at different bits of the common information field in the modified MU-RTS frame (or the single-user trigger frame). For example, the first subfield is located at B4 to B15 of the common information field, the third subfield may be located at B20 to B35 of the common information field, and the second subfield is located at B36 of the common information field. For another example, the first subfield is the UL length subfield in the common information field, the third subfield is located at B20 to B35 of the common information field, and the second subfield is located at B36 of the common information field. It should be further understood that various implementations of the second subfield and the first subfield may be randomly combined, and are not enumerated herein.

Optionally, the modified MU-RTS frame may not only be used to allocate a time resource to the second device, but also have a basic function of the MU-RTS frame, that is, have a function of requesting for a CTS frame. In other words, the modified MU-RTS frame has two functions. One is to allocate a time resource to the second device for single-user transmission, and the other is to request for a CTS frame from the second device. However, whether the second device needs to feed back a CTS frame in this interaction process may be indicated by the first device in the modified MU-RTS frame. In other words, if the first device requires the second device to send a CTS frame, the second device should send a CTS frame. If the first device does not require the second device to send a CTS, the second device may send a CTS frame (the second device may choose to send a CTS frame or skip sending a CTS frame).

S203: The second device receives the MAC frame.

S204: The second device parses the MAC frame.

Optionally, after receiving the MAC frame, the second device parses the MAC frame to obtain the second subfield included in the MAC frame; and determines, according to an indication of the second subfield, that the MAC frame is a single-user trigger frame (or a modified MU-RTS frame), where the single-user trigger frame is used to allocate a time resource to the second device.

Optionally, the single-user trigger frame may be further used to trigger a single station (a station in a broad sense herein, that is, an AP or a STA) to respond in an SU PPDU manner. Therefore, after determining that the MAC frame is a single-user trigger frame (or a modified MU-RTS frame), the second device sends an SU PPDU, where the SU PPDU is not a CTS frame.

Optionally, after determining that the MAC frame is a single-user trigger frame (or a modified MU-RTS frame), the second device sends a CTS frame, and then sends an SU PPDU, where the SU PPDU is not a CTS frame.

Optionally, after determining that the MAC frame is a single-user trigger frame (or a modified MU-RTS frame), the second device may continue to parse the MAC frame, to obtain a time resource allocated to the second device by using the single-user trigger frame. The second device communicates with another station (a station in a broad sense herein, that is, an AP or a STA) on the allocated time resource.

It can be learned that in this embodiment of this application, a field (that is, the second subfield) is included in a MAC frame, to explicitly indicate that the MAC frame is a single-user trigger frame, and the MAC frame may be distinguished from an MU-RTS frame, so that a receive end responds correspondingly based on different received frames. In addition, in this embodiment of this application, a reserved subfield in a common information field or a user information subfield of an MU-RTS frame is used to design the first subfield, to indicate time duration allocated to a target station (that is, the second device in this application), so that the target station (that is, the second device in this application) can communicate with another station on the allocated time resource, to support communication in a scheduled P2P scenario and a Co-TDMA scenario.

In an optional embodiment, the time resource allocation and receiving method provided in this application may be further applied to a multi-link scenario. A difference from Embodiment 1 and Embodiment 2 lies in that the first subfield indicates a length of a response frame (for example, a BA frame). It should be understood that the length of the response frame indicated by the first subfield is determined by the first device. It should be further understood that, in a multi-link scenario, the first device may be an AP in an AP MLD, and the second device is a STA associated with the AP (that is, the first device) in a non-AP MLD. Optionally, to distinguish between functions of the first subfield in the single-user trigger frame in different scenarios, indication information may be carried in the single-user trigger frame, to indicate functions of the first subfield in the single-user trigger frame in different scenarios. In a scheduled P2P scenario and a Co-TDMA scenario, the first subfield indicates time duration allocated to the second device. In a multi-link scenario, the first subfield indicates a length of a response frame.

It should be understood that in different scenarios, a frame format design of the single-user trigger frame and frame format designs of the first subfield and the second subfield do not change. To be specific, when the time resource allocation and receiving method provided in this embodiment of this application is applied to a multi-link scenario, for the frame format design of the single-user trigger frame (for example, the "Tr" carried in the downlink data or aggregated with the data frame in FIG. 4) and the designs of the first subfield and the second subfield, refer to corresponding descriptions in Embodiment 1 and Embodiment 2. Details are not described herein again. In other words, in a multi-link scenario, an MU-RTS frame may still be used to design a single-user trigger frame, to implicitly or explicitly indicate that a currently sent MAC frame is a single-user trigger frame (or a modified MU-RTS frame), and further indicate a length of a response frame (for example, a BA frame). The single-user trigger frame (or the modified MU-RTS frame) in the multi-link scenario may be carried in downlink data or aggregated with a data frame.

It can be learned that, in this embodiment of this application, an MU-RTS frame is used to design a single-user trigger frame applied to a multi-link scenario, so that a frame length of a response frame can be indicated, unnecessary system overheads can be reduced (because many fields in the MU-RTS frame are reserved), and a single station can be triggered to respond by using an SU PPDU, better protecting a channel and reducing overheads.

The foregoing content describes in detail the method provided in this application. To facilitate implementation of the foregoing solutions in embodiments of this application, embodiments of this application further provide corresponding apparatuses or devices.

Figure 16:
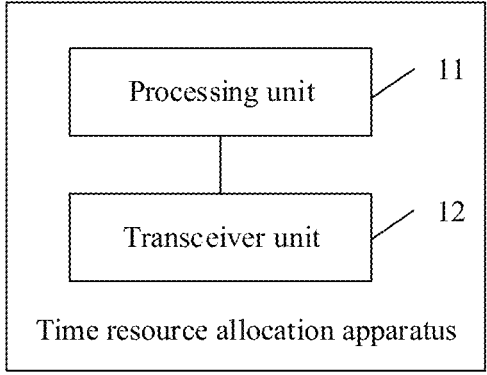
FIG. 16 is a schematic diagram depicting a structure of a time resource allocation apparatus according to an embodiment of this application.
Figure 17:
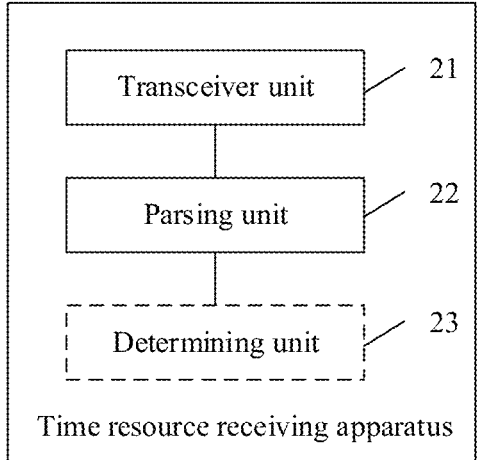
FIG. 17 is a schematic diagram depicting a structure of a time resource receiving apparatus according to an embodiment of this application.
Figure 18:
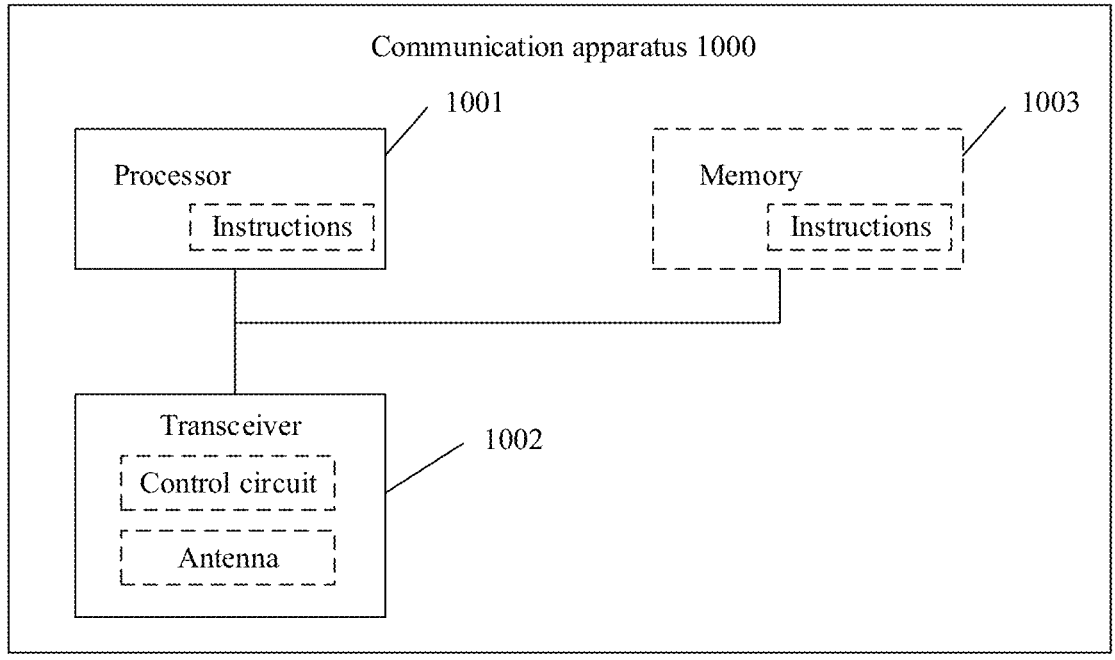
FIG. 18 is a schematic diagram depicting a structure of a communication apparatus 1000 according to an embodiment of this application.

In embodiments of this application, the first device and the second device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation. With reference to FIG. 16 to FIG. 18, the following describes in detail a time resource allocation apparatus and a time resource receiving apparatus in embodiments of this application. The time resource allocation apparatus is the first device or an apparatus in the first device, and the time resource receiving apparatus is the second device or an apparatus in the second device.

When an integrated unit is used, refer to FIG. 16. FIG. 16 is a schematic diagram depicting a structure of a time resource allocation apparatus 1 according to an embodiment of this application. The time resource allocation apparatus may be a first device or a chip in the first device, for example, a Wi-Fi chip. As shown in FIG. 16, the time resource allocation apparatus includes a processing unit 11 and a transceiver unit 12.

In a design, the processing unit 11 is configured to generate a MAC frame, where a trigger type subfield in the MAC frame is set to 3 and the MAC frame includes no user information field, and a receiver address field in the MAC frame is set to a MAC address of a second device. The transceiver unit 12 is configured to send the MAC frame. That the trigger type subfield in the MAC frame is set to 3 and the MAC frame includes no user information field indicates that the MAC frame is a single-user trigger frame, where the single-user trigger frame is used to allocate a time resource to the second device. It should be understood that when the trigger type subfield in the MAC frame is set to 3, it indicates an MU-RTS frame.

Optionally, the MAC frame includes a first subfield, and the first subfield indicates time duration allocated to the second device.

Optionally, the first subfield is a reserved subfield in a common information field in the MAC frame. Optionally, the first subfield is specifically an uplink length subfield reserved in the common information field in the MAC frame.

Optionally, a length of the first subfield is 12 bits or 16 bits.

It should be understood that in this design, the time resource allocation apparatus may correspondingly perform Embodiment 1, and the foregoing operations or functions of the units in the time resource allocation apparatus are separately used to implement corresponding operations of the first device in Embodiment 1. For technical effects of the units, refer to the technical effects in Embodiment 1. For brevity, details are not described herein again.

In another design, the processing unit 11 is configured to generate a MAC frame, where the MAC frame includes a second subfield, the second subfield indicates that the MAC frame is a single-user trigger frame, and the single-user trigger frame is used to allocate a time resource to a second device. The transceiver unit 12 is configured to send the MAC frame. A trigger type subfield in the MAC frame is set to 3.

Optionally, the second subfield is an RU allocation subfield whose value is a first preset value in a user information field in the MAC frame. The first preset value is a value that is not used in the 802.11be standard and that is of values 0 to 60 and 68 to 255.

Optionally, the second subfield is an AID12 subfield whose value is a second preset value in the user information field in the MAC frame. The second preset value is one of 2008 to 2044 and 2047 to 4094. A receiver address field in the MAC frame is set to a MAC address of the second device; or a reserved subfield in the user information field in the MAC frame indicates an association identifier of the second device.

Optionally, the second subfield is a reserved subfield in a common information field of the MAC frame, and a value of the second subfield is different from a value of the second subfield in a reserved state.

Optionally, the second subfield is a reserved subfield in the user information field of the MAC frame, and a value of the second subfield is different from a value of the second subfield in a reserved state.

Optionally, the MAC frame further includes a first subfield, and the first subfield indicates time duration allocated to the second device.

Optionally, the first subfield is a reserved subfield in the common information field in the MAC frame. The first subfield is different from the second subfield. Optionally, the first subfield is specifically an uplink length subfield reserved in the common information field in the MAC frame.

Optionally, the first subfield is a reserved subfield in the user information field in the MAC frame. The first subfield is different from the second subfield.

Optionally, a length of the first subfield is 12 bits or 16 bits.

It should be understood that in this design, the time resource allocation apparatus may correspondingly perform Embodiment 2, and the foregoing operations or functions of the units in the time resource allocation apparatus are separately used to implement corresponding operations of the first device in Embodiment 2. For technical effects of the units, refer to the technical effects in Embodiment 2. For brevity, details are not described herein again.

Refer to FIG. 17. FIG. 17 is a schematic diagram depicting a structure of a time resource receiving apparatus according to an embodiment of this application. The time resource allocation apparatus may be a second device or a chip in the second device, for example, a Wi-Fi chip. As shown in FIG. 17, the time resource receiving apparatus includes a transceiver unit 21, a parsing unit 22, and optionally includes a determining unit 23.

In a design, the transceiver unit 21 is configured to receive a media access control MAC frame, where a receiver address field in the MAC frame is set to a MAC address of the second device. The parsing unit 22 is configured to parse the MAC frame, to obtain that a trigger type subfield in the MAC frame is set to 3 and the MAC frame includes no user information field. The determining unit 23 is configured to determine, according to that the trigger type subfield in the MAC frame is set to 3 and the MAC frame includes no user information field, that the MAC frame is a single-user trigger frame, where the single-user trigger frame is used to allocate a time resource to the second device. It should be understood that when the trigger type subfield in the MAC frame is set to 3, it indicates an MU-RTS frame.

Optionally, the MAC frame includes a first subfield, and the first subfield indicates time duration allocated to the second device.

Optionally, the first subfield is a reserved subfield in a common information field in the MAC frame. Optionally, the first subfield is specifically an uplink length subfield reserved in the common information field in the MAC frame.

Optionally, a length of the first subfield is 12 bits or 16 bits.

The parsing unit 22 and the determining unit 23 may be integrated into one unit, for example, a processing unit.

It should be understood that in this design, the time resource receiving apparatus may correspondingly perform Embodiment 1, and the foregoing operations or functions of the units in the time resource receiving apparatus are separately used to implement corresponding operations of the second device in Embodiment 1. For technical effects of the units, refer to the technical effects in Embodiment 1. For brevity, details are not described herein again.

In another design, the transceiver unit 21 is configured to receive a MAC frame, where the MAC frame includes a second subfield, the second subfield indicates that the MAC frame is a single-user trigger frame, and the single-user trigger frame is used to allocate a time resource to the second device. The parsing unit 22 is configured to parse the MAC frame.

Optionally, the second subfield is an RU allocation subfield whose value is a first preset value in a user information field in the MAC frame. The first preset value is a value that is not used in the 802.11be standard and that is of values 0 to 60 and 68 to 255.

Optionally, the second subfield is an AID12 subfield whose value is a second preset value in the user information field in the MAC frame. The second preset value is one of 2008 to 2044 and 2047 to 4094. A receiver address field in the MAC frame is set to a MAC address of the second device; or a reserved subfield in the user information field in the MAC frame indicates an association identifier of the second device.

Optionally, the second subfield is a reserved subfield in a common information field of the MAC frame, and a value of the second subfield is different from a value of the second subfield in a reserved state.

Optionally, the second subfield is a reserved subfield in the user information field of the MAC frame, and a value of the second subfield is different from a value of the second subfield in a reserved state.

Optionally, the MAC frame further includes a first subfield, and the first subfield indicates time duration allocated to the second device.

Optionally, the first subfield is a reserved subfield in the common information field in the MAC frame. The first subfield is different from the second subfield. Optionally, the first subfield is specifically an uplink length subfield reserved in the common information field in the MAC frame.

Optionally, the first subfield is a reserved subfield in the user information field in the MAC frame. The first subfield is different from the second subfield.

Optionally, a length of the first subfield is 12 bits or 16 bits.

The parsing unit 22 may also be referred to as a processing unit.

It should be understood that in this design, the time resource receiving apparatus may correspondingly perform Embodiment 2, and the foregoing operations or functions of the units in the time resource receiving apparatus are separately used to implement corresponding operations of the second device in Embodiment 2. For technical effects of the units, refer to the technical effects in Embodiment 2. For brevity, details are not described herein again.

The foregoing describes the first device and the second device in embodiments of this application. The following describes possible product forms of the first device and the second device. It should be understood that a product in any form that has the functions of the first device in FIG. 16 and a product in any form that has the functions of the second device in FIG. 17 fall within the protection scope of embodiments of this application. It should be further understood that the following description is merely an example, and does not limit product forms of the first device and the second device in embodiments of this application.

In a possible product form, the first device or the second device in embodiment of this application may be implemented by using a general bus architecture.

For ease of description, refer to FIG. 18. FIG. 18 is a schematic diagram depicting a structure of a communication apparatus 1000 according to an embodiment of this application. The communication apparatus 1000 may be a first device, a second device, or a chip in the first device or the second device. FIG. 18 shows only main components of the communication apparatus 1000. In addition to a processor 1001 and a transceiver 1002, the communication apparatus may further include a memory 1003 and an input/output apparatus (not shown in the figure).

The processor 1001 is mainly configured to process a communication protocol and communication data, control the communication apparatus, execute a software program, and process data of the software program. The memory 1003 is mainly configured to store the software program and the data. The transceiver 1002 may include a control circuit and an antenna. The control circuit is mainly configured to perform conversion between a baseband signal and a radio frequency signal and process the radio frequency signal. The antenna is mainly configured to send and receive a radio frequency signal in a form of an electromagnetic wave. The input/output apparatus, such as a touchscreen, a display, or a keyboard, is mainly configured to: receive data input by a user and output data to the user.

After the communication apparatus is powered on, the processor 1001 may read the software program in the memory 1003, interpret and execute instructions of the software program, and process data of the software program. When data needs to be sent wirelessly, the processor 1001 performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

The processor 1001, the transceiver 1002, and the memory 1003 may be connected through a communication bus.

In a design, the communication apparatus 1000 may be configured to perform a function of the first device in Embodiment 1. The processor 1001 may be configured to perform step S101 in FIG. 9, and/or configured to perform another process of the technology described in this specification. The transceiver 1002 may be configured to perform step S102 in FIG. 9, and/or configured to perform another process of the technology described in this specification.

In another design, the communication apparatus 1000 may be configured to perform a function of the second device in Embodiment 1. The processor 1001 may be configured to perform step S104 and step S105 in FIG. 9, and/or configured to perform another process of the technology described in this specification. The transceiver 1002 may be configured to perform step S103 in FIG. 9, and/or configured to perform another process of the technology described in this specification.

In a design, the communication apparatus 1000 may be configured to perform a function of the first device in Embodiment 2. The processor 1001 may be configured to perform step S201 in FIG. 14, and/or configured to perform another process of the technology described in this specification. The transceiver 1002 may be configured to perform step S202 in FIG. 14, and/or configured to perform another process of the technology described in this specification.

In another design, the communication apparatus 1000 may be configured to perform a function of the second device in Embodiment 2. The processor 1001 may be configured to perform step S204 in FIG. 14, and/or configured to perform another process of the technology described in this specification. The transceiver 1002 may be configured to perform step S203 in FIG. 14, and/or configured to perform another process of the technology described in this specification.

In any one of the foregoing designs, the processor 1001 may include a transceiver configured to implement sending and receiving functions. For example, the transceiver may be a transceiver circuit, an interface, or an interface circuit. The transceiver circuit, the interface, or the interface circuit configured to implement the sending and receiving functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, so that the communication apparatus 1000 can perform the method described in any one of the foregoing method embodiments. The computer program may be fixed in the processor 1001. In this case, the processor 1001 may be implemented by hardware.

In an implementation, the communication apparatus 1000 may include a circuit, and the circuit may implement a sending, receiving, or communication function in the foregoing method embodiments. The processor and the transceiver described in this application may be implemented on an integrated circuit (integrated circuit, IC), an analog IC, a radio frequency integrated circuit (radio frequency integrated circuit, RFIC), a mixed-signal IC, an application-specific integrated circuit (application specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 18. The communication apparatus may be an independent device or may be a part of a larger device. For example, the communication apparatus may be:

(1) an independent integrated circuit IC, a chip, or a chip system or subsystem;

(2) a set including one or more ICs, where optionally, the IC set may further include a storage component configured to store data and a computer program;

(3) an ASIC, for example, a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device or the like.

In a possible product form, the first device or the second device in embodiments of this application may be implemented by a general-purpose processor.

The general-purpose processor implementing the first device includes a processing circuit and an input/output interface that is internally connected to and communicates with the processing circuit.

In a design, the general-purpose processor may be configured to perform a function of the first device in Embodiment 1. Specifically, the processing circuit is configured to perform step S101 in FIG. 9, and/or another process of the technology described in this specification. The input/output interface is configured to perform step S102 in FIG. 9, and/or another process of the technology described in this specification.

In another design, the general-purpose processor may be configured to perform a function of the first device in Embodiment 2. Specifically, the processing circuit is configured to perform step S201 in FIG. 14, and/or another process of the technology described in this specification. The input/output interface is configured to perform step S202 in FIG. 14, and/or another process of the technology described in this specification.

The general-purpose processor implementing the second device includes a processing circuit and an input/output interface that is internally connected to and communicates with the processing circuit.

In a design, the general-purpose processor may be configured to perform a function of the second device in Embodiment 1. Specifically, the processing circuit is configured to perform step S104 and step S105 in FIG. 9, and/or another process of the technology described in this specification. The input/output interface is configured to perform step S103 in FIG. 9, and/or another process of the technology described in this specification.

In another design, the general-purpose processor may be configured to perform a function of the second device in Embodiment 2. Specifically, the processing circuit is configured to perform step S204 in FIG. 14, and/or another process of the technology described in this specification. The input/output interface is configured to perform step S203 in FIG. 14, and/or another process of the technology described in this specification.

It should be understood that the communication apparatuses in the foregoing various product forms have any function of the first device or the second device in the foregoing method embodiments, and details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system, including a first device and a second device. The first device and the second device may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A method, comprising:

generating, by a first device, a media access control (MAC) frame, wherein the MAC frame comprises a second subfield, the second subfield indicates that the MAC frame is a modified multi-user request-to-send frame, and the modified multi-user request-to-send frame indicates a time resource allocated to a second device, and wherein the second subfield is a reserved subfield in a common information field or a user information field of the MAC frame, and a value of the second subfield is different from a value of the second subfield in a reserved state; and sending, by the first device, the MAC frame.

2. The method according to claim 1, wherein the second subfield is a reserved subfield in the common information field of the MAC frame.

3. The method according to claim 1, wherein the second subfield is a reserved subfield in the user information field of the MAC frame.

4. The method according to claim 1, wherein the MAC frame further comprises a first subfield, and the first subfield indicates time duration allocated to the second device.

5. The method according to claim 4, wherein the first subfield is a reserved subfield in a common information field of the MAC frame, and the first subfield is different from the second subfield.

6. The method according to claim 4, wherein the first subfield is an uplink length subfield reserved in a common information field of the MAC frame, and the first subfield is different from the second subfield.

7. The method according to claim 4, wherein the first subfield is a reserved subfield in a user information field of the MAC frame, and the first subfield is different from the second subfield.

8. The method according to claim 1, wherein a trigger type subfield in the MAC frame is set to 3.

9. A communication apparatus, comprising at least one processor, at least one memory coupled to the at least one processor, and a transceiver, wherein the at least one memory stores programming instructions for execution by the at least one processor to cause the communication apparatus to perform operations comprising:

generating, by the at least one processor, a media access control (MAC) frame, wherein the MAC frame comprises a second subfield, the second subfield indicates that the MAC frame is a modified multi-user request-to-send frame, and the modified multi-user request-to-send frame indicates a time resource allocated to a second device, and wherein the second subfield is a reserved subfield in a common information field or a user information field of the MAC frame, and a value of the second subfield is different from a value of the second subfield in a reserved state; and sending, by the transceiver, the MAC frame.

10. The communication apparatus according to claim 9, wherein the second subfield is a reserved subfield in the common information field of the MAC frame.

11. The communication apparatus according to claim 9, wherein the second subfield is a reserved subfield in the user information field of the MAC frame.

12. The communication apparatus according to claim 9, wherein the MAC frame further comprises a first subfield, and the first subfield indicates time duration allocated to the second device.

13. The communication apparatus according to claim 12, wherein the first subfield is a reserved subfield in a common information field of the MAC frame, and the first subfield is different from the second subfield.

14. The communication apparatus according to claim 12, wherein the first subfield is a reserved subfield in a user information field of the MAC frame, and the first subfield is different from the second subfield.

15. The communication apparatus according to claim 9, wherein a trigger type subfield in the MAC frame is set to 3.

16. A non-transitory computer-readable storage medium, wherein the non-transitory computer-readable storage medium stores program instructions for execution by at least one processor of an apparatus to cause the apparatus to perform operations comprising:

generating a media access control (MAC) frame, wherein the MAC frame comprises a second subfield, the second subfield indicates that the MAC frame is a modified multi-user request-to-send frame, and the modified multi-user request-to-send frame indicates a time resource allocated to a second device, and wherein the second subfield is a reserved subfield in a common information field or a user information field of the MAC frame, and a value of the second subfield is different from a value of the second subfield in a reserved state; and sending the MAC frame.

17. The non-transitory computer-readable storage medium according to claim 16, wherein the second subfield is a reserved subfield in the common information field of the MAC frame.

18. The non-transitory computer-readable storage medium according to claim 16, wherein the MAC frame further comprises a first subfield, and the first subfield indicates time duration allocated to the second device.

19. The non-transitory computer-readable storage medium according to claim 18, wherein the first subfield is a reserved subfield in a user information field of the MAC frame, and the first subfield is different from the second subfield.

20. The non-transitory computer-readable storage medium according to claim 16, wherein a trigger type subfield in the MAC frame is set to 3.

* * * * *